(12) United States Patent
Maheshwari et al.

(10) Patent No.: US 6,934,070 B1
(45) Date of Patent: Aug. 23, 2005

(54) CHIRPED OPTICAL MEM DEVICE

(75) Inventors: Dinesh Maheshwari, Fremont, CA (US); Jahia Trisnadi, Cupertino, CA (US); Robert W. Corrigan, Sisters, OR (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 91 days.

(21) Appl. No.: 10/323,008

(22) Filed: Dec. 18, 2002

(51) Int. Cl.⁷ ............................................. G02B 26/00
(52) U.S. Cl. ....................... 359/290; 359/291; 359/295
(58) Field of Search .............................. 359/290, 291, 359/295, 231, 292, 572, 573, 130, 563, 566, 237, 124, 298, 238; 347/255, 239, 241, 256

(56) References Cited

U.S. PATENT DOCUMENTS

| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |

(Continued)

FOREIGN PATENT DOCUMENTS

| DE | 32 33 195 A1 | 3/1983 | ............ H01L/23/52 |
| DE | 43 23 799 A1 | 1/1994 | ............ H01L/23/50 |
| DE | 197 23 618 A1 | 12/1997 | .............. G03F/1/14 |
| DE | 197 51 716 A1 | 5/1998 | ............ G02B/27/14 |
| DE | 198 46 532 C1 | 5/2000 | ............ G02B/27/09 |
| EP | 0 089 044 A2 | 9/1983 | ............ H01L/23/10 |
| EP | 0 261 901 A2 | 3/1988 | ............. G09G/3/36 |
| EP | 0 314 437 A1 | 10/1988 | ............ H01L/25/08 |
| EP | 0 304 263 A2 | 2/1989 | ......... H01L/25/065 |
| EP | 0 306 308 A2 | 3/1989 | ............ H04N/3/14 |
| EP | 0 322 714 A2 | 7/1989 | ............ G02B/5/30 |
| EP | 0 627 644 A3 | 9/1990 | ........... G02B/27/00 |
| EP | 0 417 039 A1 | 3/1991 | ........... G03B/21/20 |
| EP | 0 423 513 A2 | 4/1991 | ........... H01S/3/085 |
| EP | 0 436 738 A1 | 7/1991 | ............ H04N/5/74 |
| EP | 0 458 316 A2 | 11/1991 | ........... G06K/11/06 |
| EP | 0 477 566 A2 | 4/1992 | ........... G02B/26/08 |
| EP | 0 488 326 A3 | 6/1992 | ............ G09G/3/28 |
| EP | 0 499 566 A2 | 8/1992 | ............ G06F/3/033 |
| EP | 0 528 646 A1 | 2/1993 | ............. G09G/3/02 |

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modulators for Fiber–Optic and Display Applications", Ph.D. Stanford University Feb., 1992.

(Continued)

*Primary Examiner*—Georgia Epps
*Assistant Examiner*—Brandi Thomas
(74) *Attorney, Agent, or Firm*—Okamoto & Benedicto LLP

(57) ABSTRACT

A light modulator comprises a series of ribbons divided by a series of gaps. Sequences of consecutive ribbons and gaps are grouped together to form a plurality of pixels that are configured to process a respective plurality of wavelengths. The spacing from center-line to center-line of adjacent pixels is progressively increased from a reference pixel to align component pixels with their assigned wavelengths. The widths of ribbons and gaps within a particular pixel affect the polarization dependent loss of a pixel, and affect the first order diffraction angle. Ribbon widths and gap widths within successive pixels are altered to normalize polarization dependent loss and first order diffraction angles against the values associated with a reference pixel.

29 Claims, 10 Drawing Sheets

U.S. PATENT DOCUMENTS

| | | | |
|---|---|---|---|
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.16 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/12.1 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,257,053 A * | 3/1981 | Gilbreath | 347/261 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |

| Patent | Date | Inventor | Class |
|---|---|---|---|
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/95.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,031,144 A | 7/1991 | Persky | |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |

| | | | | | | |
|---|---|---|---|---|---|---|
| 5,142,677 A | 8/1992 | Ehlig et al. ............... 395/650 | 5,231,432 A | 7/1993 | Glenn ...................... 353/31 |
| 5,144,472 A | 9/1992 | Sang, Jr. et al. ........... 359/254 | 5,233,456 A | 8/1993 | Nelson ................... 359/214 |
| 5,147,815 A | 9/1992 | Casto ........................ 437/51 | 5,233,460 A | 8/1993 | Partlo et al. ............... 359/247 |
| 5,148,157 A | 9/1992 | Florence .................... 340/783 | 5,233,874 A | 8/1993 | Putty et al. ............. 73/517 AV |
| 5,148,506 A | 9/1992 | McDonald ................. 385/16 | 5,237,340 A | 8/1993 | Nelson ..................... 346/108 |
| 5,149,405 A | 9/1992 | Bruns et al. ............. 204/129.1 | 5,237,435 A | 8/1993 | Kurematsu et al. ........... 359/41 |
| 5,150,205 A | 9/1992 | Um et al. ................... 358/60 | 5,239,448 A | 8/1993 | Perkins et al. ............. 361/764 |
| 5,151,718 A | 9/1992 | Nelson ..................... 346/160 | 5,239,806 A | 8/1993 | Maslakow ................... 53/432 |
| 5,151,724 A | 9/1992 | Kikinis ...................... 357/17 | 5,240,818 A | 8/1993 | Mignardi et al. ........... 430/321 |
| 5,151,763 A | 9/1992 | Marek et al. ................ 357/26 | 5,245,686 A | 9/1993 | Faris et al. ................ 385/120 |
| 5,153,770 A | 10/1992 | Harris ...................... 359/245 | 5,247,180 A | 9/1993 | Mitcham et al. ......... 250/492.1 |
| 5,155,604 A | 10/1992 | Miekka et al. ............... 359/2 | 5,247,593 A | 9/1993 | Lin et al. .................... 385/17 |
| 5,155,615 A | 10/1992 | Tagawa ..................... 359/213 | 5,249,245 A | 9/1993 | Lebby et al. ................. 385/89 |
| 5,155,778 A | 10/1992 | Magel et al. ................ 385/18 | 5,251,057 A | 10/1993 | Guerin et al. ............... 359/249 |
| 5,155,812 A | 10/1992 | Ehlig et al. ................ 395/275 | 5,251,058 A | 10/1993 | MacArthur ................. 359/249 |
| 5,157,304 A | 10/1992 | Kane et al. ................ 313/495 | 5,254,980 A | 10/1993 | Hendrix et al. .............. 345/84 |
| 5,159,485 A | 10/1992 | Nelson ..................... 359/291 | 5,255,100 A | 10/1993 | Urbanus ................... 358/231 |
| 5,161,042 A | 11/1992 | Hamada ..................... 359/41 | 5,256,869 A | 10/1993 | Lin et al. ................ 250/201.9 |
| 5,162,787 A | 11/1992 | Thompson et al. ......... 340/794 | 5,258,325 A | 11/1993 | Spitzer et al. ................ 437/86 |
| 5,164,019 A | 11/1992 | Sinton ....................... 136/249 | 5,260,718 A | 11/1993 | Rommelmann et al. 346/107 R |
| 5,165,013 A | 11/1992 | Faris ........................ 395/104 | 5,260,798 A | 11/1993 | Um et al. .................. 358/233 |
| 5,168,401 A | 12/1992 | Endriz ...................... 359/625 | 5,262,000 A | 11/1993 | Welbourn et al. ........... 156/643 |
| 5,168,406 A | 12/1992 | Nelson ..................... 359/855 | 5,272,473 A | 12/1993 | Thompson et al. ............ 345/7 |
| 5,170,156 A | 12/1992 | DeMond et al. ........... 340/794 | 5,278,652 A | 1/1994 | Urbanus et al. ............. 358/160 |
| 5,170,269 A | 12/1992 | Lin et al. ...................... 359/9 | 5,278,925 A | 1/1994 | Boysel et al. ................. 385/14 |
| 5,170,283 A | 12/1992 | O'Brien et al. ............. 359/291 | 5,280,277 A | 1/1994 | Hornbeck ................... 345/108 |
| 5,172,161 A | 12/1992 | Nelson ..................... 355/200 | 5,281,887 A | 1/1994 | Engle ........................ 310/335 |
| 5,172,262 A | 12/1992 | Hornbeck .................. 359/223 | 5,281,957 A | 1/1994 | Schoolman ................... 345/8 |
| 5,177,724 A | 1/1993 | Gelbart ................... 369/44.16 | 5,285,105 A | 2/1994 | Cain .......................... 257/672 |
| 5,178,728 A | 1/1993 | Boysel et al. ............... 156/656 | 5,285,196 A | 2/1994 | Gale, Jr. ..................... 345/108 |
| 5,179,274 A | 1/1993 | Sampsell ................. 250/208.2 | 5,285,407 A | 2/1994 | Gale et al. .............. 365/189.11 |
| 5,179,367 A | 1/1993 | Shimizu .................... 340/700 | 5,287,096 A | 2/1994 | Thompson et al. ......... 345/147 |
| 5,181,231 A | 1/1993 | Parikh et al. ................. 377/26 | 5,287,215 A | 2/1994 | Warde et al. ............... 359/293 |
| 5,182,665 A | 1/1993 | O'Callaghan et al. ........ 359/95 | 5,289,172 A | 2/1994 | Gale, Jr. et al. ............. 345/108 |
| 5,185,660 A | 2/1993 | Um ............................. 358/60 | 5,291,317 A | 3/1994 | Newswanger ................ 359/15 |
| 5,185,823 A | 2/1993 | Kaku et al. | 5,291,473 A | 3/1994 | Pauli ......................... 369/112 |
| 5,188,280 A | 2/1993 | Nakao et al. ............... 228/123 | 5,293,511 A | 3/1994 | Poradish et al. ............. 257/434 |
| 5,189,404 A | 2/1993 | Masimo et al. ............. 340/720 | 5,296,408 A | 3/1994 | Wilbarg et al. ............. 437/203 |
| 5,189,505 A | 2/1993 | Bartelink ................... 257/419 | 5,296,891 A | 3/1994 | Vogt et al. .................... 355/67 |
| 5,191,405 A | 3/1993 | Tomita et al. .............. 257/777 | 5,296,950 A | 3/1994 | Lin et al. ....................... 359/9 |
| 5,192,864 A | 3/1993 | McEwen et al. ............ 250/234 | 5,298,460 A | 3/1994 | Nishiguchi et al. .......... 437/183 |
| 5,192,946 A | 3/1993 | Thompson et al. ......... 340/794 | 5,299,037 A | 3/1994 | Sakata ........................ 359/41 |
| 5,198,895 A | 3/1993 | Vick ......................... 358/103 | 5,299,289 A | 3/1994 | Omae et al. .................. 359/95 |
| D334,557 S | 4/1993 | Hunter et al. .............. D14/114 | 5,300,813 A | 4/1994 | Joshi et al. ................. 257/752 |
| D334,742 S | 4/1993 | Hunter et al. .............. D14/113 | 5,301,062 A | 4/1994 | Takahashi et al. ........... 359/567 |
| 5,202,785 A | 4/1993 | Nelson ..................... 359/214 | 5,303,043 A | 4/1994 | Glenn ......................... 348/40 |
| 5,206,629 A | 4/1993 | DeMond et al. ........... 340/719 | 5,303,055 A | 4/1994 | Hendrix et al. ............. 348/761 |
| 5,206,829 A | 4/1993 | Thakoor et al. | 5,307,056 A | 4/1994 | Urbanus ..................... 340/189 |
| 5,208,818 A | 5/1993 | Gelbart et al. ............... 372/30 | 5,307,185 A | 4/1994 | Jones et al. ................... 359/41 |
| 5,208,891 A | 5/1993 | Prysner ..................... 385/116 | 5,310,624 A | 5/1994 | Ehrlich ...................... 430/322 |
| 5,210,637 A | 5/1993 | Puzey ....................... 359/263 | 5,311,349 A | 5/1994 | Anderson et al. ............ 359/223 |
| 5,212,115 A | 5/1993 | Cho et al. ................... 437/208 | 5,311,360 A | 5/1994 | Bloom et al. ............... 359/572 |
| 5,212,555 A | 5/1993 | Stoltz ........................ 358/206 | 5,312,513 A | 5/1994 | Florence et al. ............. 156/643 |
| 5,212,582 A | 5/1993 | Nelson ..................... 359/224 | 5,313,479 A | 5/1994 | Florence ..................... 372/26 |
| 5,214,308 A | 5/1993 | Nishiguchi et al. .......... 257/692 | 5,313,648 A | 5/1994 | Ehlig et al. ................. 395/800 |
| 5,214,419 A | 5/1993 | DeMond et al. ........... 340/794 | 5,313,835 A | 5/1994 | Dunn ......................... 73/505 |
| 5,214,420 A | 5/1993 | Thompson et al. ......... 340/795 | 5,315,418 A | 5/1994 | Sprague et al. ............... 359/41 |
| 5,216,278 A | 6/1993 | Lin et al. | 5,315,423 A | 5/1994 | Hong ........................ 359/124 |
| 5,216,537 A | 6/1993 | Hornbeck .................. 359/291 | 5,315,429 A | 5/1994 | Abramov |
| 5,216,544 A | 6/1993 | Horikawa et al. ........... 359/622 | 5,319,214 A | 6/1994 | Gregory et al. ......... 250/504 R |
| 5,219,794 A | 6/1993 | Satoh et al. ................. 437/209 | 5,319,668 A | 6/1994 | Luecke ...................... 372/107 |
| 5,220,200 A | 6/1993 | Blanton ..................... 257/778 | 5,319,789 A | 6/1994 | Ehlig et al. ................. 395/800 |
| 5,221,400 A | 6/1993 | Staller et al. ................ 156/292 | 5,319,792 A | 6/1994 | Ehlig et al. ................. 395/800 |
| 5,221,982 A | 6/1993 | Faris ......................... 359/93 | 5,320,709 A | 6/1994 | Bowden et al. |
| 5,224,088 A | 6/1993 | Atiya ......................... 369/97 | 5,321,416 A | 6/1994 | Bassett et al. .................. 345/8 |
| D337,320 S | 7/1993 | Hunter et al. .............. D14/113 | 5,323,002 A | 6/1994 | Sampsell et al. .......... 250/252.1 |
| 5,226,099 A | 7/1993 | Mignardi et al. ............ 385/19 | 5,323,051 A | 6/1994 | Adams et al. .............. 257/417 |
| 5,229,597 A | 7/1993 | Fukatsu | 5,325,116 A | 6/1994 | Sampsell ................... 346/108 |
| 5,230,005 A | 7/1993 | Rubino et al. ................ 372/20 | 5,327,286 A | 7/1994 | Sampsell et al. ............ 359/561 |
| 5,231,363 A | 7/1993 | Sano et al. ................. 332/109 | 5,329,289 A | 7/1994 | Sakamoto et al. ........... 345/126 |
| 5,231,388 A | 7/1993 | Stoltz ........................ 340/783 | 5,330,301 A | 7/1994 | Brancher ................... 414/417 |

| Patent | Date | Inventor | Class |
|---|---|---|---|
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |
| 5,351,052 A | 9/1994 | D'Hont et al. | 342/42 |
| 5,352,926 A | 10/1994 | Andrews | 257/717 |
| 5,354,416 A | 10/1994 | Okudaira | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,371,543 A | 12/1994 | Anderson | 348/270 |
| 5,371,618 A | 12/1994 | Tai et al. | 359/53 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |

| Patent | Date | Inventor | Class |
|---|---|---|---|
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,552,635 A | 9/1996 | Kim et al. | |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,770,473 A | 6/1998 | Hall et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,832,148 A | 11/1998 | Yariv | |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 356/572 |
| 5,841,929 A | 11/1998 | Komatsu et al. | |
| 5,844,711 A * | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin et al. | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,012,336 A | 1/2000 | Eaton et al. | |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,096,656 A | 8/2000 | Matzke et al. | |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |

| Patent Number | Date | Inventor | Class |
|---|---|---|---|
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,249,381 B1 | 6/2001 | Suganuma | |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,282,213 B1 | 8/2001 | Gutin et al. | |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,313,901 B1 | 11/2001 | Cacharelis | |
| 6,323,984 B1 | 11/2001 | Trisnadi | 359/245 |
| 6,342,960 B1 | 1/2002 | McCullough | 359/124 |
| 6,346,430 B1 | 2/2002 | Raj et al. | |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,418,152 B1 | 7/2002 | Davis | |
| 6,421,179 B1 | 7/2002 | Gutin et al. | 359/572 |
| 6,438,954 B1 | 8/2002 | Goetz et al. | |
| 6,445,502 B1 | 9/2002 | Islam et al. | 359/571 |
| 6,452,260 B1 | 9/2002 | Corbin et al. | 257/686 |
| 6,476,848 B2 * | 11/2002 | Kowarz et al. | 347/255 |
| 6,479,811 B1 | 11/2002 | Kruschwitz et al. | |
| 6,480,634 B1 | 11/2002 | Corrigan | 385/4 |
| 6,497,490 B1 | 12/2002 | Miller et al. | 359/614 |
| 6,525,863 B1 | 2/2003 | Riza | 359/290 |
| 6,563,974 B2 | 5/2003 | Agha Riza | 385/18 |
| 6,569,717 B1 | 5/2003 | Murade | |
| 6,678,085 B2 * | 1/2004 | Kowarz et al. | 359/291 |
| 6,724,515 B1 * | 4/2004 | Kowarz | 359/290 |
| 2001/0019454 A1 | 9/2001 | Tadic-Galeb et al. | 359/649 |
| 2002/0015230 A1 | 2/2002 | Pilossof et al. | 359/558 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131228 A1 | 9/2002 | Potter | |
| 2002/0131230 A1 | 9/2002 | Potter | 361/277 |
| 2002/0135708 A1 | 9/2002 | Murden et al. | |
| 2002/0176151 A1 | 11/2002 | Moon et al. | |
| 2002/0195418 A1 | 12/2002 | Kowarz et al. | |
| 2002/0196492 A1 * | 12/2002 | Trisnadi et al. | 359/124 |
| 2003/0056078 A1 | 3/2003 | Johansson et al. | |
| 2003/0099026 A1 * | 5/2003 | Sandstrom | 359/292 |

FOREIGN PATENT DOCUMENTS

| | | | |
|---|---|---|---|
| EP | 0 530 760 A2 | 3/1993 | G09G/3/34 |
| EP | 0 550 189 A1 | 7/1993 | G02F/1/315 |
| EP | 0 627 644 A2 | 12/1993 | G02B/27/00 |
| EP | 0 610 665 A1 | 8/1994 | G09G/3/34 |
| EP | 0 627 850 A1 | 12/1994 | H04N/5/64 |
| EP | 0 643 314 A2 | 3/1995 | G02B/27/00 |
| EP | 0 654 777 A1 | 5/1995 | G09G/3/34 |
| EP | 0 658 868 A1 | 6/1995 | G09G/3/34 |
| EP | 0 658 830 A1 | 12/1995 | G09G/3/34 |
| EP | 0 689 078 A1 | 12/1995 | G02B/26/08 |
| EP | 0 801 319 A1 | 10/1997 | G02B/26/00 |
| EP | 0 851 492 A2 | 7/1998 | H01L/23/538 |
| EP | 1 003 071 A2 | 5/2000 | G03B/27/72 |
| EP | 1 014 143 A1 | 6/2000 | G03B/26/08 |
| EP | 1 014 927 A2 | 10/2000 | B41J/2/455 |
| GB | 2 117 564 A | 10/1983 | H01L/25/08 |
| GB | 2 118 365 A | 10/1983 | H01L/27/13 |
| GB | 2 266 385 A | 10/1993 | G02B/23/10 |
| GB | 2 296 152 A | 6/1996 | H04N/13/04 |
| GB | 2 319 424 A | 5/1998 | H04N/13/04 |
| JP | 53-39068 | 4/1978 | H01L/23/12 |
| JP | 55-111151 | 8/1980 | H01L/27/00 |
| JP | 57-31166 | 2/1982 | H01L/23/48 |
| JP | 57-210638 | 12/1982 | H04L/21/60 |
| JP | 60-49638 | 3/1985 | H01L/21/60 |
| JP | 60-94756 | 5/1985 | H01L/25/04 |
| JP | 60-250639 | 12/1985 | H01L/21/58 |
| JP | 61-142750 | 6/1986 | H01L/21/60 |
| JP | 61-145838 | 7/1986 | H01L/21/60 |
| JP | 63-234767 | 9/1988 | H04N/1/04 |
| JP | 63-305323 | 12/1988 | G02F/1/13 |
| JP | 1-155637 | 6/1989 | H01L/21/66 |
| JP | 40-1155637 | 6/1989 | H01L/21/92 |
| JP | 2219092 | 8/1990 | G09G/3/28 |
| JP | 4-333015 | 11/1992 | G02B/27/18 |
| JP | 7-281161 | 10/1995 | G02F/1/1333 |
| JP | 3288369 | 3/2002 | G02B/26/06 |
| WO | WO 90/13913 | 11/1990 | H01L/23/10 |
| WO | WO 92/12506 | 7/1992 | G09F/9/37 |
| WO | WO 93/02269 | 2/1993 | E06B/5/10 |
| WO | WO 93/09472 | 5/1993 | G03F/7/20 |
| WO | WO 93/18428 | 9/1993 | G02B/27/00 |
| WO | WO 93/22694 | 11/1993 | G02B/5/18 |
| WO | WO 94/09473 | 4/1994 | G09G/3/34 |
| WO | WO 94/29761 | 12/1994 | G02B/27/24 |
| WO | WO 95/11473 | 4/1995 | G02B/27/00 |
| WO | WO 96/02941 | 2/1996 | H01L/23/02 |
| WO | WO 96/08031 | 3/1996 | H01J/29/12 |
| WO | WO 96/41217 | 12/1996 | G02B/5/18 |
| WO | WO 96/41224 | 12/1996 | G02B/19/00 |
| WO | WO 97/22033 | 6/1997 | G02B/27/22 |
| WO | WO 97/26569 | 7/1997 | G02B/5/18 |
| WO | WO 98/05935 | 2/1998 | G01L/9/06 |
| WO | WO 98/24240 | 6/1998 | H04N/9/31 |
| WO | WO 98/41893 | 9/1998 | G02B/26/08 |
| WO | WO 99/07146 | 2/1999 | H04N/7/16 |
| WO | WO 99/12208 | 3/1999 | H01L/25/065 |
| WO | WO 99/23520 | 5/1999 | G02B/26/08 |
| WO | WO 99/34484 | 7/1999 | |
| WO | WO 99/59335 | 11/1999 | H04N/5/765 |
| WO | WO 99/63388 | 12/1999 | G02B/27/22 |
| WO | WO 99/67671 | 12/1999 | G02B/26/08 |
| WO | WO 00/04718 | 1/2000 | H04N/7/167 |
| WO | WO 00/07225 | 2/2000 | H01L/21/00 |
| WO | WO 01/04674 A1 | 1/2001 | G02B/6/12 |
| WO | WO 01/06297 A3 | 1/2001 | G02B/27/10 |
| WO | WO 01/57581 A3 | 8/2001 | G02B/27/48 |
| WO | WO 02/025348 A3 | 3/2002 | G02B/26/02 |
| WO | WO 02/31575 A2 | 4/2002 | G02B/27/00 |
| WO | WO 02/058111 A2 | 7/2002 | |
| WO | WO 02/065184 A3 | 8/2002 | G02B/27/12 |
| WO | WO 02/073286 A1 | 9/2002 | G02B/26/08 |
| WO | WO 02/084375 A1 | 10/2002 | G02B/26/08 |
| WO | WO 02/084397 A3 | 10/2002 | G02B/27/18 |
| WO | WO 03/001281 A1 | 1/2003 | G02F/1/01 |
| WO | WO 03/001716 A1 | 1/2003 | H04J/14/02 |
| WO | WO 03/012523 A1 | 2/2003 | G02B/26/00 |

| | | | | |
|---|---|---|---|---|
| WO | WO 03/016965 A1 | 2/2003 | ............ | G02B/5/18 |
| WO | WO 03/023849 A1 | 3/2003 | ........... | H01L/23/02 |
| WO | WO 03/025628 A2 | 3/2003 | | |

OTHER PUBLICATIONS

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990). pp 69–78.

R. Gerhard–Multhaupt, "Light–Valve Technologies for High–Definition Television Projection Displays", Displays vol 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7$^{th}$ International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmford, Essex, GB 1993.

M. Farn et al., "Color Separation by use of Binary Optics." Optics Letters, vol. 18:15 pp. 1214–1216. 1993.

P. Alvelda, "VLSI Microdisplays and Optoelectric Technology," MIT. pp. 1–93. 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures." Supercritical Fluids, Chapter 18, American Chemical Society. pp 255–269, 1997.

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design." Optical Engineering. vol. 38, No. 3, pp 552–557. Mar. 1999.

R. Tepe, et al "Viscoelastic Spatial Light Modulator with Active Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp 79–85, Germany, 1988.

T. Utsunomiya and H. Sato. "Electrically Deformable Echellette Grating and Its Application to Tunable Resonator," Electronics and Communications in Japan, vol. 63–c, No. 10, pp. 94–100, Japan, 1980.

Burns, D.M. et al., *Development of microelectromechanical variable blaze gratings*. Sensors and Actuators A, pp. 7–15, 1998.

R.N. Thomas, et al "The Mirror–Matrix Tube: A Novel Light Valve for Projection Displays", IEEE Transaction on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393 Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997 pp. 377 of 379.

N.J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al , "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum–Tunable Laser, Aug. 2000, pp. 58 of 62.

Elizabeth Bruce, "Tunable Lasers", Communications, IEEE Spectrum. Feb. 2002, pp. 35 of 39.

M. G. Littman et al., "Spectrally Narrow Pulsed Dye Laser without Beam Expander", Applied Optics. vol. 17, No. 14, Jul. 15, 1978, pp. 2224 of 2227.

Apte et al., "Deformable Grating Light Valves for High Resolution Displays." Solid State Actuator Workshop. Hilton Head, South Carolina. Jun. 13–16, 1994.

Sene et al., "Polysilicon micromechnical gratings for optical modulation," Sensors and Actuators, vol. A57, pp. 145–151, 1996.

Amm et al , "Invited Paper: Grating Light Valve™ Technology. Update and Novel Applications," SID Digest, vol. 29, 1998.

Development of Digital MEMS–Based Display Technology Promises Improved Resolution, Contrast, and Speed, XP–00073009, 1997, pp. 33 of 34.

"Micromachined Opto/ElectrolMechanical Systems," Electronic Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000. p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart of Electrical Engineering, 136–93 California Institute of Technology, 1997 IEEE , pp. 1505–1508.

Harold F. Winters, "Etch products from the reaction of XeF2 with SiOZ, Si3N4, SiC, and Si in the presence of Ion Bombardment." IBM Research Laboratory, 1983 American Vacuum Society, pp. 927–931.

F.A. Houle, "Dynamics of SiF4 desorption during etching of silicon by XeF2," J. Chem Phys 87 (3). Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 549–550.

M. Parameswaran et al, "Commerical CMOS Fabricated Integrated Dynamic Thermal Scene Simulator,"1991 IEEE, pp. 29.4.1–29.4.4.

M. Parameswaran et al, "CMOS Electrothermal Microactuators," Depart. of Electrical Engineering, 1990 IEEE, pp. 128–131.

U. Streller et al., "Selectivity in dry etching of Si[100] with XeF2 and VUV light," Applied Surface Science 106, (1996), pp. 341–346.

M.J.M. Vugts et al., "Si XeF2 etching: Temperature dependence," 1996 American Vacuum Society, pp. 2766–2774.

P. Krummenacher et al, "Smart Temperature Sensor in CMOS Technology," Sensors and Actuators A–21–A–23 (1990), pp. 636–638.

Henry Baltes, "CMOS as sensor technology," Sensors and Actuators A. 37–38, (1993). pp. 51–56.

Thomas Boltshauser et al, "Piezoresistive Membrane Hygrometers Based on IC Technology," Sensor and Materials, 5. 3. (1993), pp. 125–134.

Z. Parpia et al., "Modelling of CMOS Compatible High Voltage Device Structures," pp. 41–50.

Jon Gildemetster, "Xenon Difluoride Etching System," 1997, UC Berkeley MicroTabrication Manual Chapter 7.15, p. 2–5.

W. Riethmuller et al., "A smart accelerometer with on–chip electronics fabricated by a commerical CMOS process," Sensors and Actuators A 31, (1992), 121–124.

W. Gopel et al., "Sensors—A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluroine–containing compounds," 1984 American Institute of Physics, pp. 2939–2942.

M.H. Hecht et al., "A novel x–ray photoelectron spectroscopy study of the AI/SiO2 interfaces," 1985 American Institute of Physics, pp. 5256–52616.

Daniel L. Flamm et al., "XeF2 and F–Atom Reactions with Si: Their Significance for Plasma Etching," Solid State Technology, v. 26, #4, Apr. 1983, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Process Through the MOSIS Service," National Inst. of Standards and Technology. Jun. 94, 63 pgs.

David Moser et al., "CMOS Flow Sensors," 1993 Physical Electronics Lab. Swiss Federal Institute of Tech. Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp 1933 of 1935.

P. C. Kundu et al., "Reduction of Speckle Noise by Varying the Polarisation of Illuminating Beam", XP–002183475, Dept. of Applied Physics. Calcutta University, 1975, pp 63–67.

J. W. Goodman, "Some Fundamental Properties of Speckle", XP–002181682. Dept. of Electrical Engineering. Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for I.–Cinema Applications", Silicon Light Machines. SID'99, San Jose, CA, 27 pp. 1999.

R.W. Corrigan et al., "Calibration of a Scanned Linear Grating Light–Valve, Projection System", Silicon Light Machines, San Jose, CA, 4 pgs. May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc, Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., "Silicon Modulator Based on Mechically–Active Anti–Reflection Layer with 1 Mbit/sec Capability for Fiber–in–the–Loop Applications", IEEE Photonics Technology Letters, vol. 6, No. 9, Sep. 1994, pp. 1119–1121.

J. A. Walker et al, "Demonstration of a Gain Flattened Optical Amplifier with Micromechanical Equalizer Element", Lucent Technologies, pp. 13–14.

A. P. Payne et al., "Resonance Measurements of Stresses in $Al/Si_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

\* cited by examiner

CHIRPED OPTICAL MEM DEVICE

FIELD OF THE INVENTION

The present invention relates to the field of grating light valves arranged in an array of pixels. More particularly, the present invention relates to chirping the widths of various grating light valve components in successive pixels to compensate for unwanted phenomena in a demultiplexed wavelength division multiplexed "WDM" signal.

BACKGROUND OF THE INVENTION

Optical MEM (micro-electro-mechanical) devices have applications in display, print, optical and electrical technologies. An optical MEM device, herein, is a device that is capable of constructively and destructively interfering with an incident light source to produce an optical signal or optical signals. Exemplary optical MEM devices, and methods for making the same, are disclosed in U.S. Pat. No. 5,311,360 entitled "METHOD AND APPARATUS FOR MODULATING A LIGHT BEAM," U.S. Pat. No. 5,841,579 entitled "FLAT DIFFRACTION GRATING LIGHT VALVE" and U.S. Pat. No. 5,808,797 entitled "METHOD AND APPARATUS FOR MODULATING A LIGHT BEAM" to Bloom et al. and U.S. Pat. No. 5,661,592 entitled "METHOD OF MAKING AN APPARATUS FOR A FLAT DIFFRACTION GRATING LIGHT VALVE" to Bornstein et al., the contents of which are hereby incorporated by reference.

Optical MEM devices can be fabricated from Si-based materials using lithographic techniques. Optical MEM devices can have reflective ribbons that are formed over a suitable substrate structure such that the ribbons are spatially arranged in parallel and are coupled to the substrate structure. In use, a portion of the reflective ribbons can be moved by applying an operating bias voltage, or switching voltage, across the ribbons and the substrate structure. By alternating, or switching, the potential of the bias voltage, the ribbons are alternated between the positions for constructive and destructive interference with the incident light source to generate optical signals.

Variations in the characteristics of optical signals can occur for a variety of reasons including varying polarization of the light, demultiplexing through static grating demultiplexing, light loss through spaces between the ribbons, etc. Variability in the characteristics of optical signals can be detrimental in applications where consistent optical signal characteristics are desired across the wavelength band and over time. Therefore, there is a need for an optical MEM device that is capable of producing stable optical signals exhibiting uniform optical parameters during operation.

SUMMARY OF THE INVENTION

According to embodiments of the present invention, a method of and apparatus for improving the alignment between chirped incident wavelengths of light and the center line of their respective pixels when the WDM signal is demultiplexed through a static grating demultiplexer is disclosed. The present invention is also a method of and apparatus for compensating for the variation of polarization dependent loss among varying wavelengths induced by interaction with a pixel of a grating light valve™ light modulator. According to another aspect of the embodiments, a method of and apparatus for compensating for the variation in the angle of diffraction that occurs in the diffraction patterns of varying wavelengths falling on pixels of a grating light valve™ light modulator is disclosed.

A grating light valve™ light modulator comprises a plurality of ribbons separated by a plurality of gaps. The plurality of ribbons and gaps are grouped into a plurality of pixels including a first end pixel and a second end pixel. Each pixel receives a de-multiplexed signal and the plurality of pixels receive in succession the de-multiplexed signals of increasing wavelengths such that the first end pixel receives the shortest wavelength and the second end pixel receives the longest wavelength. A pixel separation distance is defined as a distance from a center line of a first pixel to a center line of a second pixel adjacent to the first pixel. Pixel separation distances are progressively increased from the first end pixel to the second end pixel. The pixel separation distances are spaced such that a pixel center-line more closely coincides with a center-line intensity of an incident wavelength.

A method of normalizing polarization dependent loss among a plurality of pixels in a grating light valve™ light modulator against a first pixel comprises the steps of configuring a width $W_{R(n)}$ of a ribbon in the $n^{th}$ pixel as a function of a width $W_{R(ref)}$ of a ribbon in a reference pixel according to the equation $W_{R(n)} = W_{R(ref)} \cdot (\lambda_n/\lambda_{ref})$, and configuring a width $W_{RG(n)}$ of a ribbon gap in the $n^{th}$ pixel as a function of a width $W_{RG(ref)}$ of a ribbon gap in the reference pixel according to the equation $W_{RG(n)} = W_{RG(ref)} \cdot (\lambda_n/\lambda_{ref})$, wherein $\lambda_{ref}$ is a wavelength designated for the reference pixel and $\lambda_n$ is a wavelength designated for the $n^{th}$ pixel, and wherein each pixel comprises at least two ribbons and each ribbon within a pixel is separated from an adjacent ribbon within the same pixel by a ribbon gap.

A method of normalizing diffraction angles in a sequence of pixels in a grating light valve™ light modulator against a first pixel comprises the step of configuring a width $W_{R2}$ and $W_{G2}$ of a ribbon in the second pixel as a function of a ribbon width $W_{R1}$ and gap width $W_{G1}$ of a ribbon in the first pixel such that the equation $W_{R2} + W_{G2} = (\lambda_2/\lambda_1) \cdot (W_{R1} + W_{G1})$ holds, wherein $\lambda_1$ is a wavelength designated for the first pixel and $\lambda_2$ is a wavelength designated for the second pixel, and wherein each pixel comprises at least two ribbons, each ribbon within a pixel separated by a ribbon gap.

DETAILED DESCRIPTION OF THE EMBODIMENTS

Reference will now be made in detail to embodiments of the invention, examples of which are illustrated in the accompanying drawings.

Figure 1:
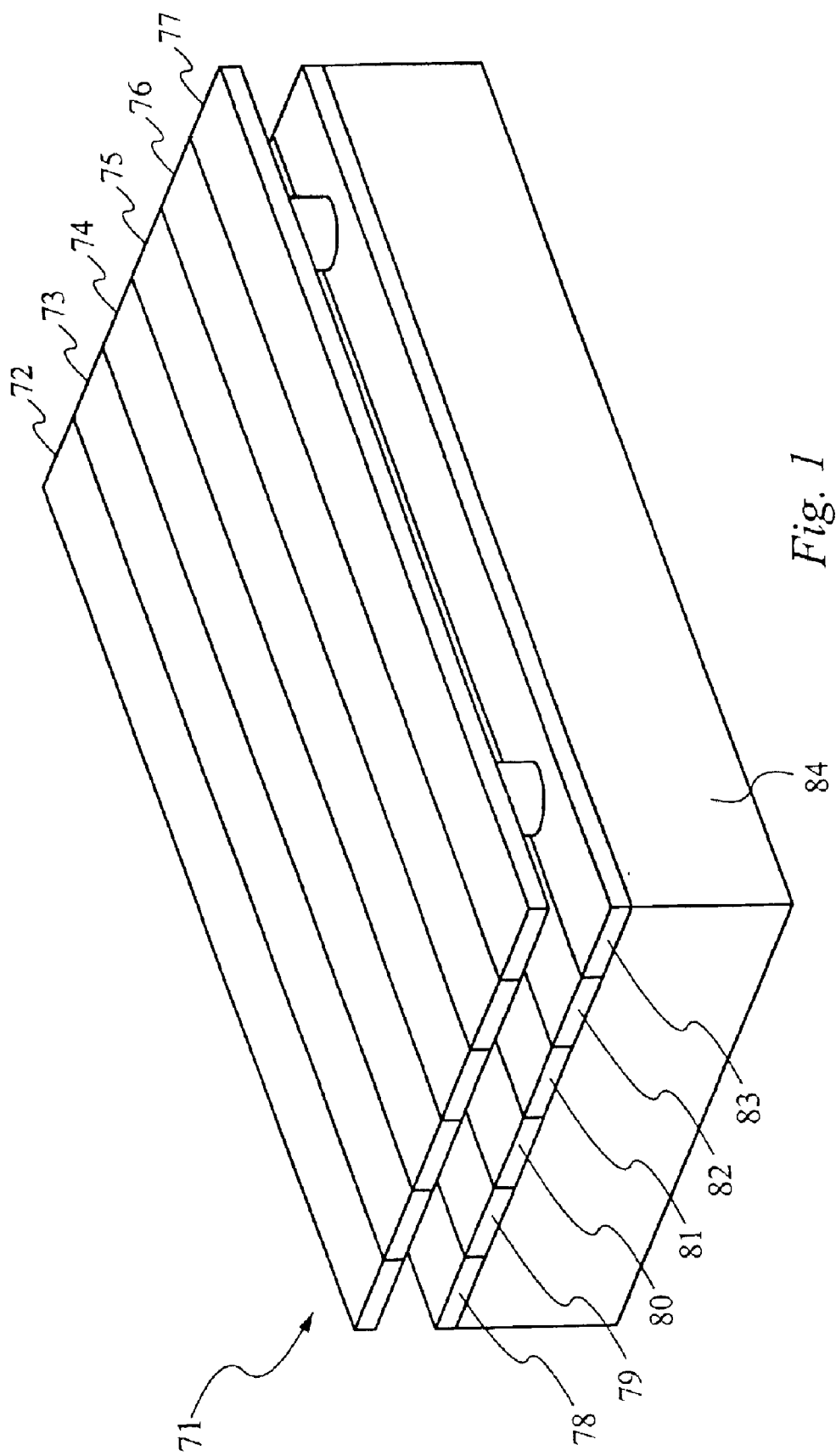
FIG. 1 is a perspective view illustrating of a grating light valve™ light modulator.

FIG. 1 is a perspective view of a grating light valve™ light modulator 71. Parallel ribbons 72–77 rest above a substrate 84 using any conventional technique. The substrate includes conductive members 78–83 which function to exert a field on their respective ribbons 72–77. A voltage potential formed between a ribbon 72–77 and its respective conductive member 78–83 exerts a force sufficient to deflect a ribbon 72–77.

Figure 2:
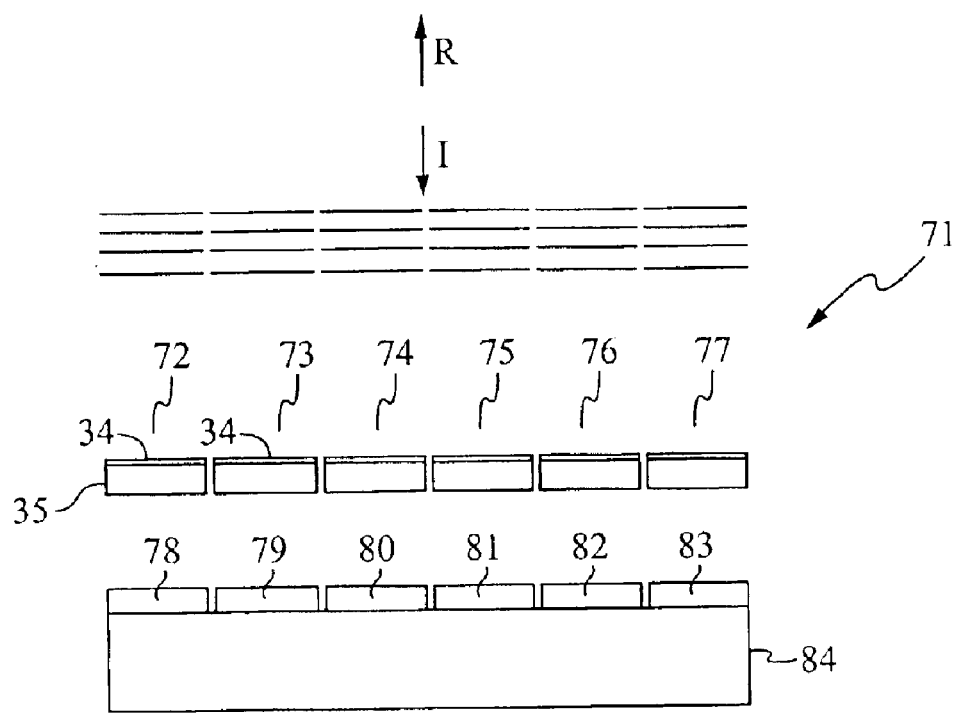
FIG. 2 is a cross sectional view of a grating light valve™ light modulator comprising a row of undeflected ribbons.

FIG. 2 illustrates a cross section side view of a grating light valve™ light modulator 71. In FIG. 2, the even ribbons 72, 74, 76 and odd ribbons 73, 75, 77 are at the same height above the substrate 84. Incident light I reflects substantially as a specular mirror when a grating light valve™ light modulator is configured as shown in FIG. 2. The ribbons are illustrated as comprising a reflective portion 34 and a resilient portion 36. It will be understood that both the reflective portion 34 and the resilient portion 36 can be formed of one or multiple layers. The reflective portion 34 reflects the incident light rays I, thereby forming reflected light rays R, and the resilient portion 35 of a movable ribbon 73, 75, 77 resists deflection, and returns the ribbon to its original position after deflection, as illustrated further in FIG. 3. In the embodiment of FIG. 2, the six ribbons 72–77 form a single pixel. In wavelength division multiplexed applications, a single pixel is typically assigned to a single wavelength. The conductive members 78–83 are charged to appropriate voltage levels to deflect the movable ribbon 73, 75, 77 but not the fixed ribbons 72, 74, 76.

Figure 3:
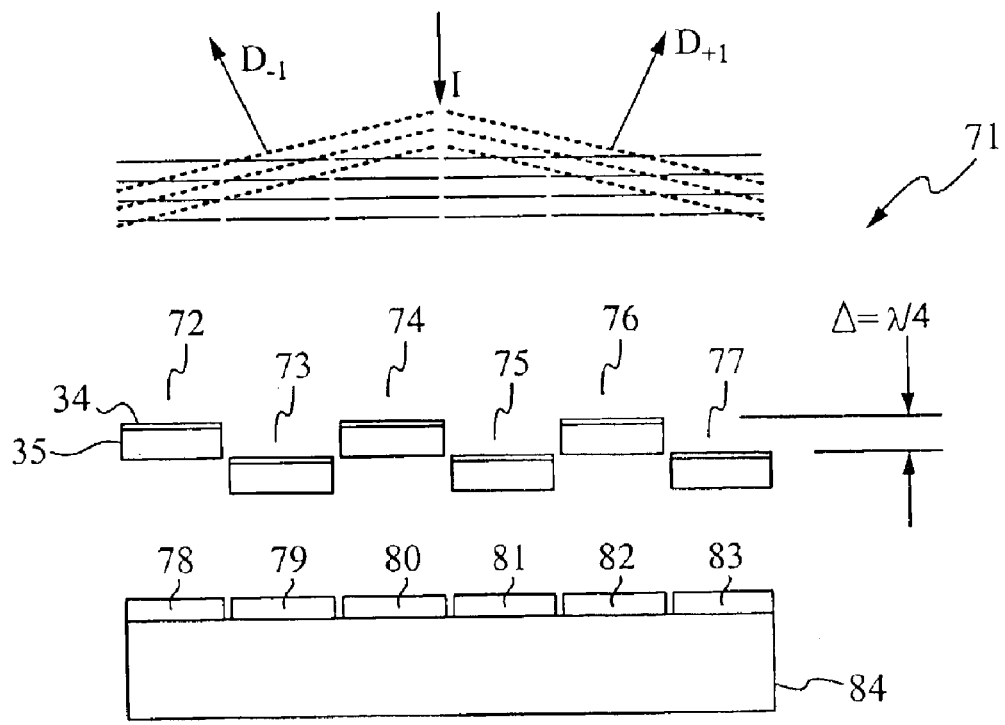
FIG. 3 is a cross sectional view of a grating light valve™ light modulator comprising a row of alternating deflected and undeflected ribbons.

FIG. 3 illustrates the grating light valve™ light modulator 71 wherein the fixed ribbons 72, 74, 76 are un-deflected, and the movable ribbons 73, 75, 77 are deflected. As shown in FIG. 3, the deflection distance Δ has been established as a distance of λ/4. FIG. 3 illustrates first order diffraction angles $D^{+1}$ and $D^{-1}$ resulting from interference of light reflected from the reflective surfaces 34 of the ribbons 72–77 of the grating light valve™ light modulator 71. As discussed above, according to the embodiment of FIG. 3, only ribbons 73, 75, 77 are deflected. However, in other grating light valve™ light modulator embodiments, all ribbons 72–77 are movable, and the separation distance Δ between adjacent ribbons is controlled by controlling the position of both the first and second set of the ribbons. As represented in FIGS. 2 and 3, the six ribbons 72–77 of the grating light valve™ light modulator 71 form a single pixel, such that the movable ribbons 73, 75, 77 are controlled in unison to reflect or diffract the same incident beam of light I to the same degree. It will be understood that this is illustrative only. A pixel can comprise other numbers of ribbons. A pixel must comprise at least two ribbons to generate a diffractive pattern, but may comprise any number of ribbons greater than two.

Figure 4:
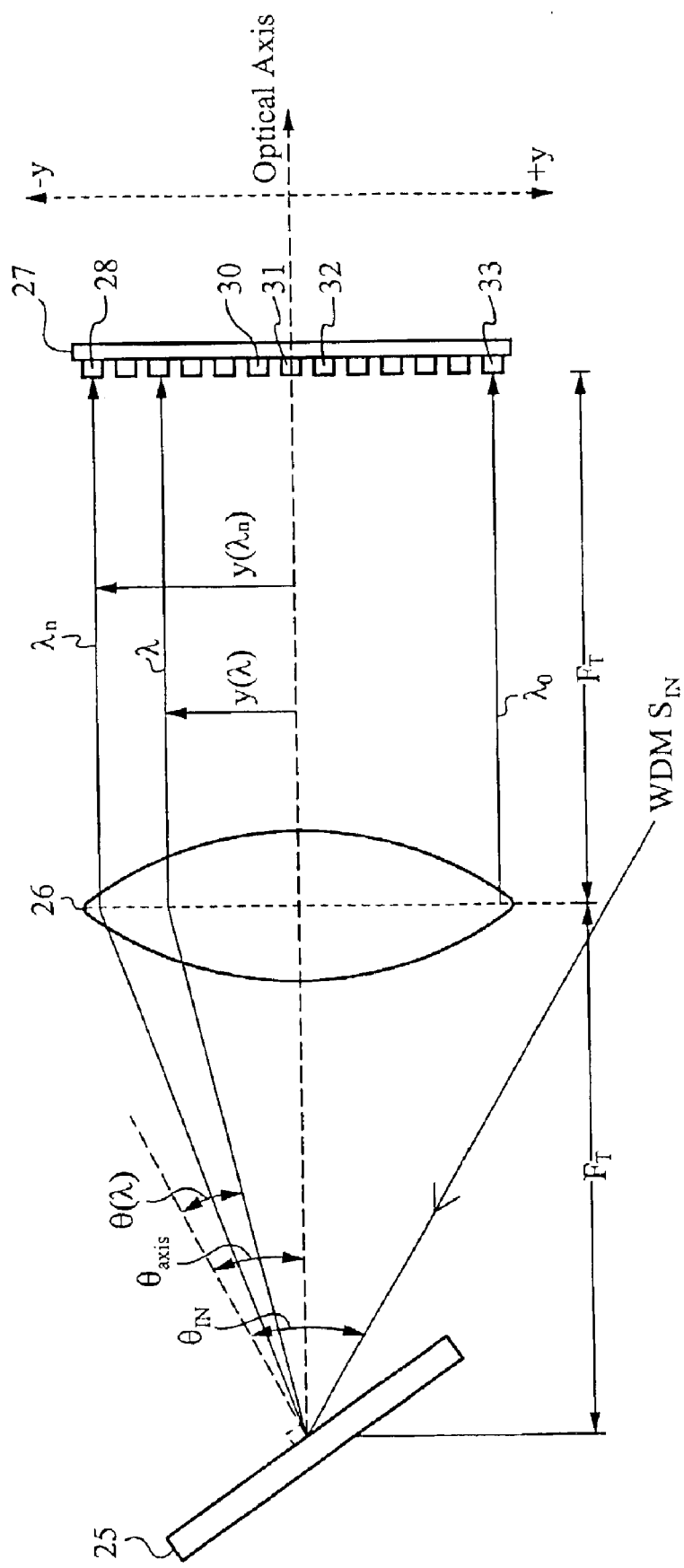
FIG. 4 is an illustration of a WDM signal on a static grating and component wavelengths are directed onto pixels of a grating light valve™ light modulator.
Figure 5:
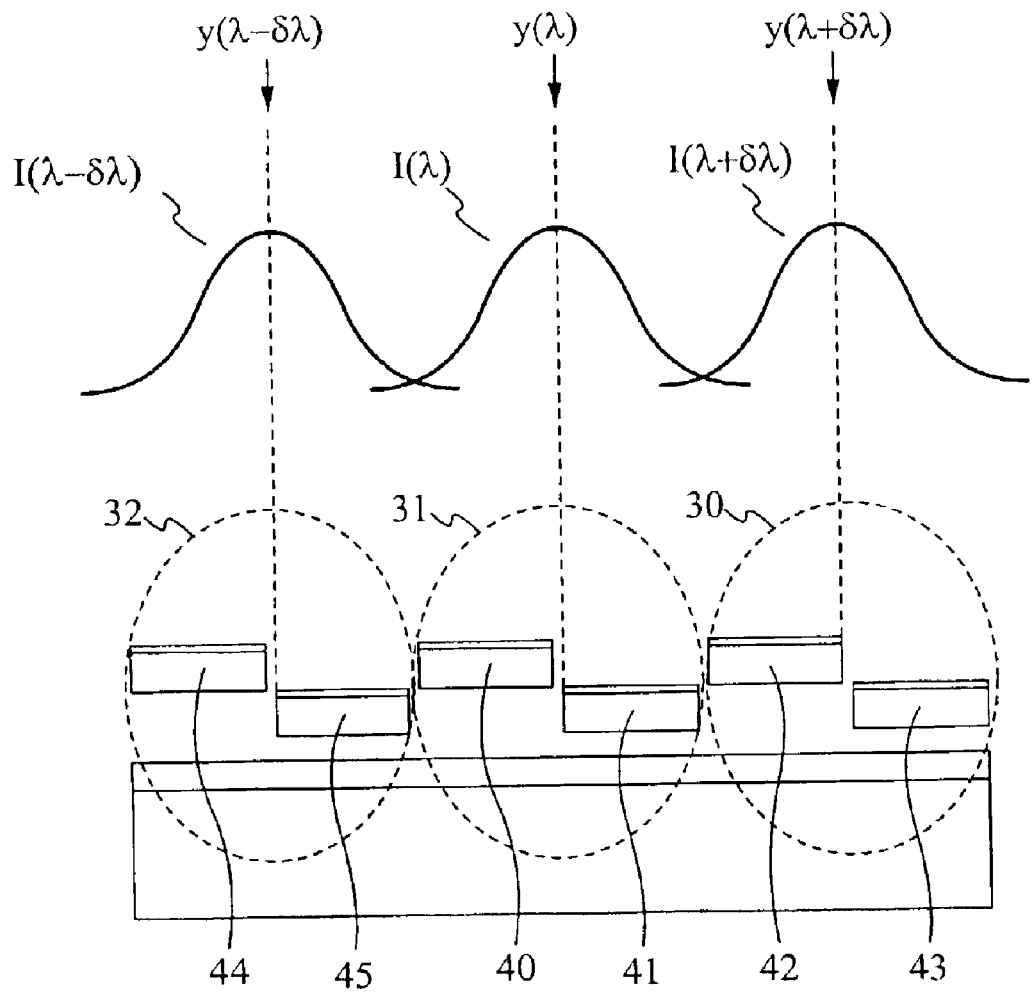
FIG. 5 is a close up illustration of incident wavelength center lines aligned with a pixel center of a corresponding pixel on the grating light type device of FIG. 4.

FIG. 4 illustrates a static grating 25 which functions to demultiplex the incoming wavelength division multiplexed (WDM) signal $S_{IN}$ into its component wavelength signals $\lambda_0$ through $\lambda_n$. The wavelengths are scattered by the static grating 25 such that an angle of dispersion θ varies with wavelength λ. The angle of dispersion θ(λ) is measured from the normal to the static grating 25. The optical axis is defined at a dispersion angle $\theta_{axis}$. The WDM signal $S_{in}$ is incident to the static grating 25 at an incidence angle $\theta_{IN}$. The dispersion angle θ(λ), in turn, determines the displacement y(λ) along the y-axis when the component wavelength intersects the transform lens 26. The transform lens 26 preferably is located a distance $F_T$ away from the static grating 25, wherein $F_T$ is the focal length from the transform lens 26. As a result of positioning the static grating 25 a focal length of the transform lens 26, wavelengths $\lambda_0$ through $\lambda_n$ exiting the transform lens 26 are oriented along paths substantially parallel to the optical axis. As the demultiplexed component wavelengths $\lambda_0$ through $\lambda_n$ pass through the lens 26, they are focused on to the grating light valve™ light modulator 27. The grating light valve™ light modulator 27 comprises a plurality of pixels 28–33. The pixels are arranged linearly along the y-axis, with each pixel 28–33 assigned to a respective incoming wavelength $\lambda_0$ through $\lambda_n$. As illustrated in FIG. 5, component wavelengths of light exhibit a substantially Gaussian distribution, which is represented by the light intensity distribution I(λ). As a result, there is typically some overlap in wavelengths, with a small component of the intensity distribution I(λ) of pixel 31 falling on the adjacent pixels 30 and 32. It is a design parameter to determine the amount of overlap. Preferably, the intensity distribution I(λ) of each adjacent channel intersects at approximately the same intensity level, which is discussed in greater detail below. For purposes of the discussion herein, however, the incident wavelength is often represented as simply being located at centerline of its respective intensity distribution I(λ).

Returning to FIG. 4, as the incoming signal $S_{IN}$ is diffracted through the static grating 25, the angle between the optical axis and a component wavelengths $\lambda_0, \ldots \lambda_n$, is represented by equation 1, $$\theta(\lambda) = \sin^{-1}[(\lambda/\Lambda_g) - \sin\theta_{IN}] \qquad 1.$$

where $\Lambda_g$ is the static grating period of the static grating 25. Accordingly, the higher the static grating period of the static grating 25, the lower the spread of the incoming component signals $\lambda_0$ through $\lambda_n$. As discussed above, the static grating 25 is typically positioned a distance $F_T$ from the transform lens 26, wherein $F_T$ is the focal length of the transform lense 26. The linear displacement y(λ) from the optical axis for each component wavelength $\lambda_0, \ldots \lambda_n$, is therefore a function of the angle θ(λ) and of the transform length $F_T$, as illustrated by equation 2, $$y(\lambda) = F_T \tan[\theta(\lambda) - \theta_{axis}] \qquad 2.$$

where the "transform length" $F_T$ is the focal length of the transform lens 26 along a path parallel to the optical axis. Equation 2 defines the center position of an incident wavelength λ, as measured from the optical axis, as it impinges the grating light valve™ light modulator 27. The linear displacement of a wavelength along the y-axis is influenced by the wavelength. As the wavelength λ increases so too does the distance between center positions of adjacent wavelengths. If the wavelength increases from $\lambda_0$ to $\lambda_n$, then the physical distance separating two consecutive de-multiplexed wavelengths along the y-axis is greater from $\lambda_{n-1}$ to $\lambda_n$ than from $\lambda_0$ to $\lambda_1$. Embodiments of the present invention include pixels positioned on the grating light valve™ light modulator 27 such that a center line of a pixel $P_\lambda$ approximately aligns with the center position of a corresponding incident wavelength λ. Such center-line alignment is herein referred to as "pixel chirping".

Once the location of the pixel center is determined as above, a pixel width is determined. The width for a pixel $P_\lambda$ is preferably determined as the distance Δx(λ), such that:

$$\Delta x(\lambda) = x(\lambda) - x(\lambda - \delta\lambda) \qquad 3.$$

where x(λ) is the center line location of the corresponding wavelength λ, x(λ−δλ) is the center line location of the preceding wavelength, and δλ represents the incremental change in the channel wavelength. Since the pixel width is centered about the pixel center line, the pixel width on either side of the pixel center is Δx(λ)/2. In this preferred embodiment, the pixel width is a function of λ, and therefore, the pixel width increases with increasing λ.

Alternatively, the pixel width is determined as the distance Δx(λ), such that:

$$\Delta x(\lambda) = [x(\lambda - \delta\lambda) - x(\lambda + \delta\lambda)]/2 \qquad 4.$$

where x(λ+δλ) is the center line location of the wavelength immediately following the wavelength λ. In other words, the pixel width is the average of the distance between the center lines of the two neighboring channels in this alternative embodiment. This averaging method of determining pixel width is not preferred for high contrast operation. However, the averaging method reduces insertion loss and requires less stringent optical alignment methods.

Once the pixel width is determined, the ribbon width of each ribbon within a same pixel is determined. In the case where 1 pixel corresponds to 1 ribbon-pair (two ribbons), a period for a channel corresponding to that pixel is the same as the pixel width. This concept can be generalized to the case where 1 pixel corresponds to n ribbon-pairs. In this general case, the calculated pixel width Δx(λ) is divided by the number of ribbon-pairs in the pixel to determine the period of 1 ribbon-pair. In this manner, the period of a single ribbon-pair, Λ(λ), is determined as:

$$\Lambda(\lambda) = \Delta x(\lambda)/n \qquad 5.$$

For a constant ribbon gap width, rg, between ribbons within the same pixel, a ribbon width W(λ) for a given pixel $P_\lambda$ is determined as:

$$W(\lambda) = [\Lambda(\lambda) - 2rg]/2 \qquad 6.$$

It is preferred that the ribbon gap width is constant throughout all pixels. Alternatively, the ribbon gap width can be varied.

FIG. 5 illustrates alignment of pixel centers and incident wavelength center lines for adjacent pixels within a grating light valve™ light modulator. The grating light valve™ light modulator 27 of FIG. 5 comprises a plurality of pixels 30–32, respectively identified by the dotted circles. According to the example of FIG. 5, each pixel 30–32 comprises two ribbons, 40 and 41, 42 and 43, and 44 and 45, respectively. The center line of incident light I(λ) of the component wavelength λ is seen to be approximately aligned with the center line of pixel 31. The center line of the pixel 31 corresponds with the location x(λ) on the grating light valve™ light modulator 27 as measured from the optical axis. The incident beam I(λ) is oriented such that the greatest intensity of the Gaussian distributed light is centered between the ribbons 40 and 41. The ribbon width and spacing between ribbons is selected to ensure that the centerline of the pixel 30 is also aligned with the centerline of the intensity distribution I(λ+δλ) of the next wavelength λ+δλ. As discussed above, however, the linear displacement of each subsequent incident wavelength becomes progressively greater as the wavelength increases, so that the linear displacement x(λ)−x(λ−δλ) is not as great as the linear displacement x(λ+δλ)−x(λ).

FIG. 5 illustrates a portion of a "channel chirped" grating light valve™ light modulator, in which a center line of each pixel of the grating light valve™ light modulator is approximately aligned with a center line of its corresponding incident wavelength. If the grating light valve™ light modulator of FIG. 5 were not pixel chirped, and instead each pixel was evenly spaced across the entire length of the grating light valve™ light modulator, a drift of the incident beams I(λ) from the center line of its respective pixel would occur. In certain cases, the aggregate drift can become so significant that the center line of an incident beam I(λ) can fall between pixels, and eventually cause a pixel to be "skipped" such that n-1 wavelengths are spread over n pixels or more. It can be readily appreciated that such lack of correlation between pixels and wavelengths is not ideal for controlling the diffraction of individual wavelengths.

Figure 6:
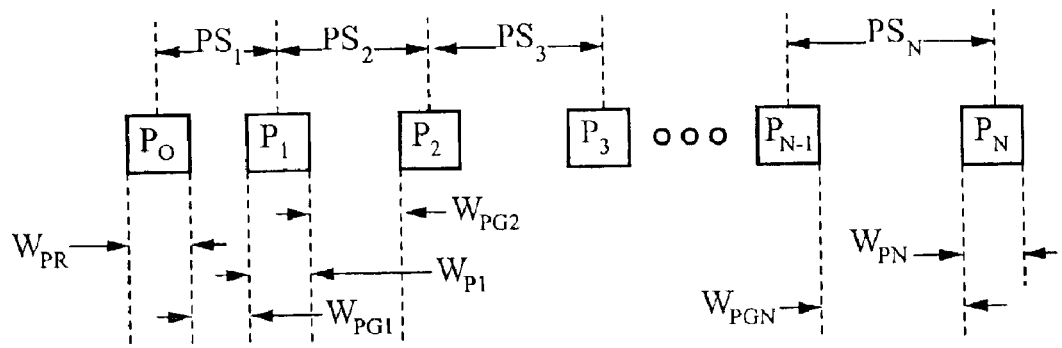
FIG. 6 illustrates an array of pixels showing various dimensions of pixels and pixel spacing.

FIG. 6 illustrates a chirped grating light valve™ light modulator valve type array according to the present invention. The array comprises a first end pixel $P_0$, through a second end pixel $P_N$ disposed to receive progressively increasing incident wavelengths $\lambda_0$ through $\lambda_n$. According to the present invention, the array of pixels in FIG. 6 are pixel chirped to reduce or eliminate an offset error between an incident wavelength and its respective pixel. It is recalled from FIG. 4 that the process of demultiplexing a WDM signal by means of a static grating effects the separation distance between successive wavelengths. The wavelength separation distance, measured centerline to centerline of successive Gaussian functions, is not constant, but progressively increases as the wavelength frequency increases. This is referred to as channel chirping. According to FIG. 6, component pixels $P_0$–$P_N$ are pixel chirped such that the pixel separation distances $PS_1$–$PS_N$ are not constant. The incremental increase in pixel separation distances $PS_1$–$PS_N$ is preferably performed at a rate identical to the channel chirping of the respective channels as a result of the static grating demultiplexer 25 (FIG. 4), thereby aligning an incoming component wavelength with its respective pixel. Because, at small angles, the increasing separation between pixels approximates a linear function, according to one embodiment, the rate of pixel chirping selected to match the channel chirping of the incoming component wavelengths is a linear chirping rate. According to this embodiment, successive separation distances increase at the same rate. One example of a linear pixel chirping embodiment of pixel separation is represented by the equation 7.

$$PS_N = PS_1 + NC_0 \qquad 7.$$

According to equation 7 above, $PS_N$ is the pixel separation distance from the center of pixel N-1 to the center of pixel N. This distance is equal to the separation distance between the first end pixel P₀ and a second pixel P₁, represented in FIG. 7 as PS₁, plus "n" times the original chirping offset C₀, where "n" is the number of the pixels removed from the first end pixel. The original chirping offset C₀ can be selected as the difference between the first two pixel separation distances, PS₂ minus PS₁.

Those skilled in the art will recognize, however, that the while the tangent function remains near linear for small angles, a linear function does not approximate the tangent function at large angles approaching 90 degrees. Because channel chirping induced by demultiplexing a WDM signal through a static grating is technically non-linear, according to the preferred embodiment, pixels P₀–P_N are chirped at exactly the same rate as the channel chirping of the incoming wavelengths. The advantage of a non-linear pixel chirping is that the pixels can be oriented exactly in line with the incident wavelengths. The advantage of linear pixel chirping is that it may be accomplished easily, and linear pixel chirping approximates the channel chirping induced by the static grating at small angles.

Figure 7:
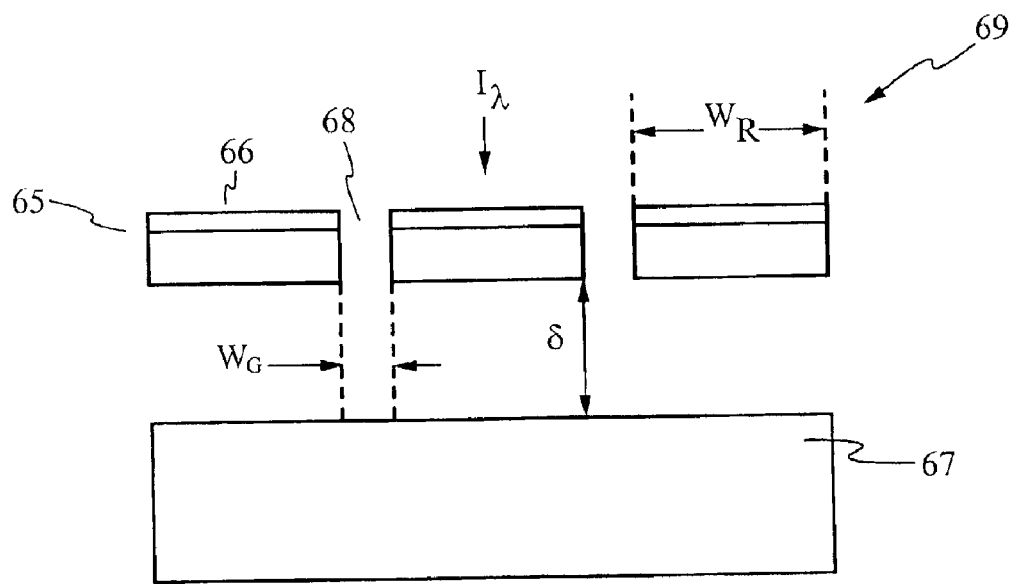
FIG. 7 illustrates various dimensions of component parts of a pixel within a grating light valve™ light modulator.

Additional dimensions referenced herein are illustrated in conjunction with the grating light valve™ light modulator 69 of FIG. 7, including the gap width "$W_G$" between two ribbons, a ribbon width "$W_R$" and the distance δ between a ribbon 65 and the substrate 67. As discussed in greater detail below, it is possible to distinguish further between gaps within a pixel, and gaps separating ribbons in different pixels.

Figure 8:
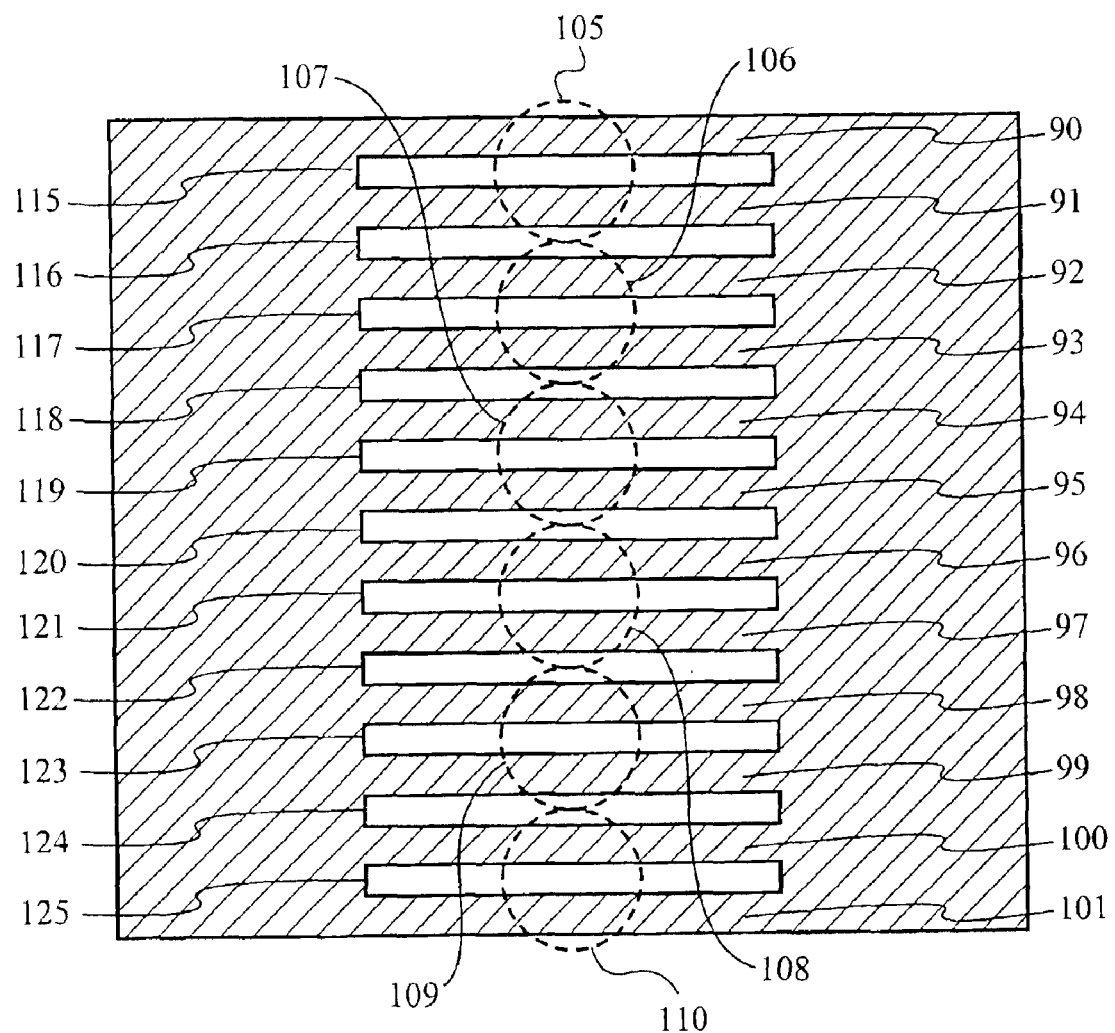
FIG. 8 illustrates a top view of a grating light valve™ light modulator comprised of ribbons and gaps divided into a plurality of pixels.

According to the grating light valve™ light modulator of FIG. 8, a series of ribbons 90–101 are separated by a series of gaps 115–125. According to one embodiment of the present invention, pixel chirping is achieved through progressively widening successive gaps 115–125. According to one embodiment, the width of the respective gaps 115–125 are progressively increased at a rate such that the resulting chirped pixel conforms to the channel chirping induced in the incident component wavelengths by the static grating 25 (FIG. 4). As a result, the center line of each Gaussian function of each wavelength is directed toward the center line of its respective pixel. Because channel chirping increases within increasing incident wavelength λ, as illustrated in conjunction with FIGS. 4–6, according to the preferred embodiment illustrated in FIG. 6, the pixel spacings PS₁, PS₂, . . . PS_N progressively widen from the first end pixel P₀ toward the second end pixel P_N.

Returning to FIG. 8, a pixel must comprise at least two ribbons, but may comprise more than two ribbons. Accordingly, the array of twelve ribbons 90–101 in the grating light valve™ light modulator depicted in FIG. 8 may comprise anywhere from a single pixel to up to six pixels, depending on the application. For exemplary purposes, the grating light valve™ light modulator of FIG. 8 is divided to comprise six pixels 105–110 (circled). A gap 116, 118, 120, 122, 124 disposed between two separate pixels is herein defined as a pixel gap comprising a width $W_{PG}$, and a gap 115, 117, 119, 121, 123, 125 separating two ribbons within the same pixel is herein defined as a ribbon gap comprising a width $W_{RG}$. Because the pixels may comprise varying numbers of ribbons, however, it can be readily understood that gap 116 functions as a pixel gap in pixel architectures comprising two ribbons per pixel, but will function as a ribbon gap in pixel architectures comprising more than two ribbons. Accordingly, it is envisioned that specific embodiments of the chirped grating light valve™ light modulator according to embodiments of the present invention may incorporate chirping of ribbon gaps exclusive of pixel gaps, or incorporate the chirping of pixel gaps exclusive of ribbon gaps, or chirp pixel gaps and ribbon gaps at different rates of increasing widths.

According to one embodiment, the ribbons 90–101 within the grating light valve™ light modulator are chirped by progressively widening the ribbons 90–101 (not shown) moving from the first end pixel P₀ to the second end pixel P_N (FIG. 7). The progressive widening of the ribbons 90–101 may be done alternatively to, or concurrently with the progressive widening of the gaps 115–125 at the same rate. By chirping the ribbon widths, gap widths, or both, the pixel separation of FIG. 7 is chirped to coincide with the centerline of the incident wavelengths.

Figure 9:
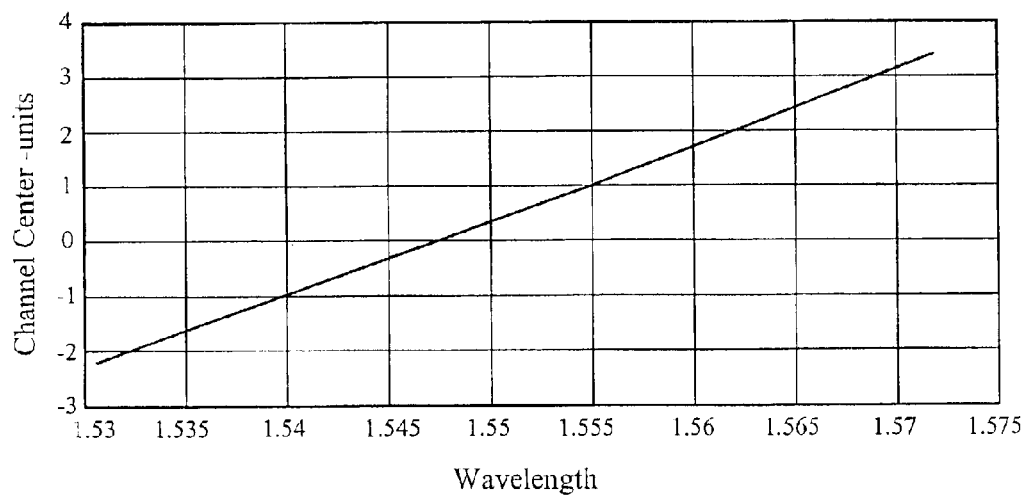
FIG. 9 graphically illustrates an exemplary relationship of the channel chirping experienced by de-multiplexed wavelengths.

FIG. 9 graphically illustrates an exemplary relationship of the channel chirping experienced by de-multiplexed wavelengths. As seen in FIG. 9, linear displacement of an incident wavelength's centerline as it impinges a grating light valve™ light modulator increases as does the wavelength.

Figure 10:
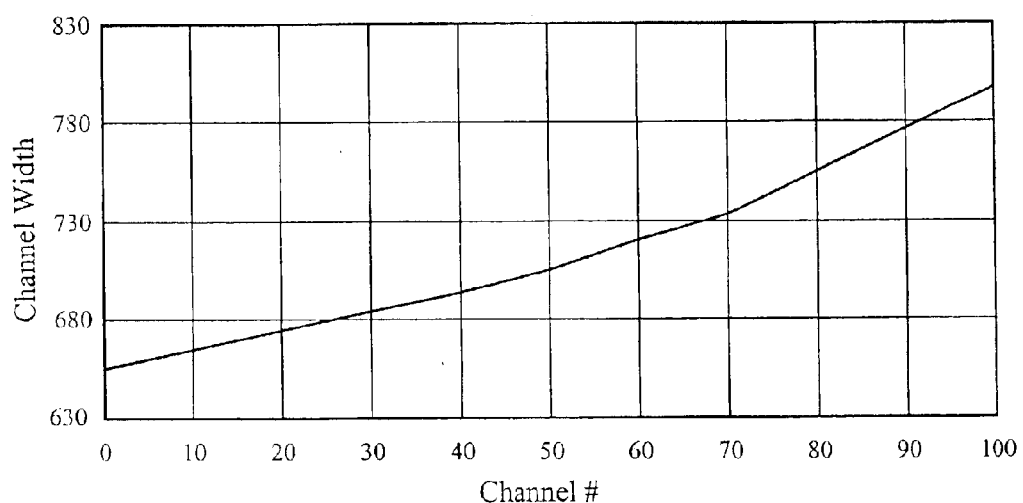
FIG. 10 graphically illustrates an exemplary representation of channel width as a function of channel number.

FIG. 10 graphically illustrates an exemplary representation of channel width, also referred to as pixel width, as a function channel number. Preferably, channel 0 corresponds to the shortest wavelength. As seen in FIG. 10, the channel width increases as does the channel number. FIG. 10 illustrates the exemplary case in which an increasing pixel width is used to provide pixel chirping.

Polarization dependent loss ("PDL") is a property inherent in an object that interacts with light. The undesirable effects associated with PDL, however, are often exacerbated as the result of a polarization shift which occurs during signal transmission. A laser generates a wavelength of light according to a particular orientation of the electric and magnetic fields, TE field orientation and TM field orientation, respectively, which is a particular polarization. However, during signal propagation in a fiber optical channel, a continual shift in polarization occurs. This shift is largely induced by characteristics present in the optical fiber.

An optical device such as a lens, slit or mirror can be rated according to the difference in power loss at various field orientations of incoming light. If the power lost in a physical interaction in the TM orientation is identical to the power lost in the TE orientation, the polarization dependent loss of the object is zero. However, if there is a different power loss at different field orientations, the object is said to exhibit a polarization dependent loss, or PDL, which is related to the difference between the loss in the TE field orientation and the loss in the TM field orientation. A power loss is not, in itself, a PDL. If an interaction with a device produces an identical loss in signals of every orientation, the PDL equals zero. There may be an interactive loss, but it is not dependent on or influenced by the field orientations. In interactions where the loss of power or intensity is greater for one field orientation than another, the PDL typically expressed in decibels, which is largely derived from the ratio represented by equation 8 below:

$$PDL = I_{min}(P \in p) \div I_{max}(P \in p) \qquad 8.$$

Equation 8 above states that PDL is the minimum intensity of a signal as a function of polarization from among the set of all possible polarizations divided by the maximum intensity of the same signal as a function of polarization from among the set of all possible polarizations. For example, if the smallest power loss of an apparatus is 3 dB one field orientation, and the maximum power loss of that apparatus is 7 dB in another field orientation, the PDL of that apparatus is 4 dB. Although maximum and minimum intensities typically occur at one of the TM and TE orientations for grating light valve™ light modulators, equation 8 above is true regardless of the field orientation at which the minimum and maximum intensities occur.

Grating light valve™ light modulators are one apparatus known to induce polarization dependent loss in a signal. More significantly, the PDL induced by a grating light valve™ light modulator is a function of the wavelength of the signal. Accordingly, the PDL is not simply a fixed value for a grating light valve™ light modulator, but is also dependent on the wavelength of incoming light.

In the propagation and processing of a wavelength division multiplexed signal, telecommunication standards often require level or constant PDL over a spectrum of frequencies, preferably within 0.3 dB, from the highest PDL to the lowest PDL among component wavelengths, and even more preferably within 0.1 dB among component wavelengths. Accordingly, an apparatus exhibiting high PDL can be unsuited for use in telecommunications. The polarization dependent loss induced by a grating light valve™ light modulator is wavelength dependant.

Referring again to FIG. 7, a pixel 69 of a grating light valve™ light modulator comprises ribbons 65 coated with a reflective coating 66. Each ribbon 65 is separated from other ribbons by a ribbon gap 68. The polarization dependent loss associated with a pixel of a grating light valve™ light modulator is a strong function of the ribbon width $W_R$ of individual ribbons 65, the ribbon gap width $W_G$ between ribbons within a pixel, and the wavelength $\lambda$ of the incident light beam $I_\lambda$. This relationship is depicted by equation 9 below for a given reflectivity coating 66 on the ribbon 65, and for a given reflectivity of the substrate 67:

$$PDL_{GLV(\lambda)} = f(W_R, W_G, \lambda, \Delta, \delta) \qquad 9.$$

According to Equation 9 above, the polarization dependent loss experienced by a grating light valve™ light modulator at a given wavelength $\lambda$ is primarily a function of ribbon width $W_R$, the ribbon gap width $W_G$, and the wavelength $\lambda$. The distance $\delta$ from the ribbon 65 to the substrate 67 and the deflection distance $\Delta$ of the ribbon (FIG. 3), have a lesser influence on the PDL experienced by a grating light valve™ light modulator.

Because telecommunication devices are not tolerant to large PDL swings over component wavelengths in a WDM signal, the present invention proposes to equalize the polarization dependent loss of multiple pixels by manipulating select parameters from among $W_R$, $W_G$, $\delta$, and $\Delta$ within the pixels respectively assigned to the various component wavelengths. The normalization is preferably done by identifying a reference pixel, and manipulating select parameters of equation 9 to normalize the PDL exhibited by the various pixels against a reference pixel. The manipulation of some of these parameters, however, is impractical for a variety of reasons, and is therefore less preferred. For example, it is difficult if not impossible to progressively increase or decrease the reflectivity of the reflective coating or the reflectivity of the substrate, over a sequence of pixels. These reflectivity values are fixed for all practical purposes. Additionally, because the deflection distance $\Delta$ is often dictated by system needs for controlling the amount of light that is reflected and diffracted, in many applications it is highly impractical and even counter productive to alter the deflection distance $\Delta$ in order to normalize PDL. The separation distance $\delta$ between an undeflected ribbon 65 (FIG. 7) and the substrate 67 is a weaker function, and therefore, not an effective means for normalizing PDL of successive pixels against a reference pixel. According to the present invention therefore, the preferred approach for normalizing the PDL of successive pixels 105–110 (FIG. 8) of a grating light valve™ light modulator against a reference pixel is by adjusting the ribbon width $W_R$ and the ribbon gap width $W_G$ in the various pixels of a grating light valve™ light modulator. As discussed above, in fabrications wherein a distinction can be made between ribbon gap widths $W_{RG}$ and pixel gap widths $W_G$, the PDL of a pixel is primarily a function of the ribbon gap width $W_{RG}$, that is, the gap widths between ribbons comprising a single specific pixel.

According to the mathematical implications of Maxwell's equations, select parameters within equation 9 can be multiplied by a constant to affect PDL of a particular pixel without destroying the functionality of equation 9. Accordingly, the PDL exhibited by pixel "n" is normalized against a reference pixel by multiplying the ribbon gap widths and the ribbon widths in pixel "n" by a ratio of wavelength $\lambda_n$ divided by a reference wavelength $\lambda_{ref}$, as illustrated in Equations 10 and 11.

$$W_{G(n)} = W_{G(ref)}(\lambda_n/\lambda_{ref}) \text{ and} \qquad 10.$$

$$W_{R(n)} = W_{R(ref)}(\lambda_n/\lambda_{ref}) \qquad 11.$$

In equations 10 and 11 above, above, $W_{G(n)}$ is the width of a ribbon gap in the $n^{th}$ pixel, $W_{G(ref)}$ is the width of a ribbon gap in the reference pixel, and $\lambda_n$ and $\lambda_{ref}$ are the wavelengths respectively assigned to pixel "n" and to the reference pixel. By progressively widening the widths of both the ribbon gap and the ribbons of the various pixels according to equations 10 and 11, the PDLs of all pixels are normalized against the PDL of the reference pixel. The application of equations 10 and 11 together is herein called "PDL chirping". The use of the term "widening" is used for verbal economy. It is understood that the present invention may equally use the widest pixel as a reference and narrow the others respectively, or use a reference pixel in the center of a linear array, with pixels on one side progressively narrowed, and pixels on the other side progressively widened.

Figure 11:
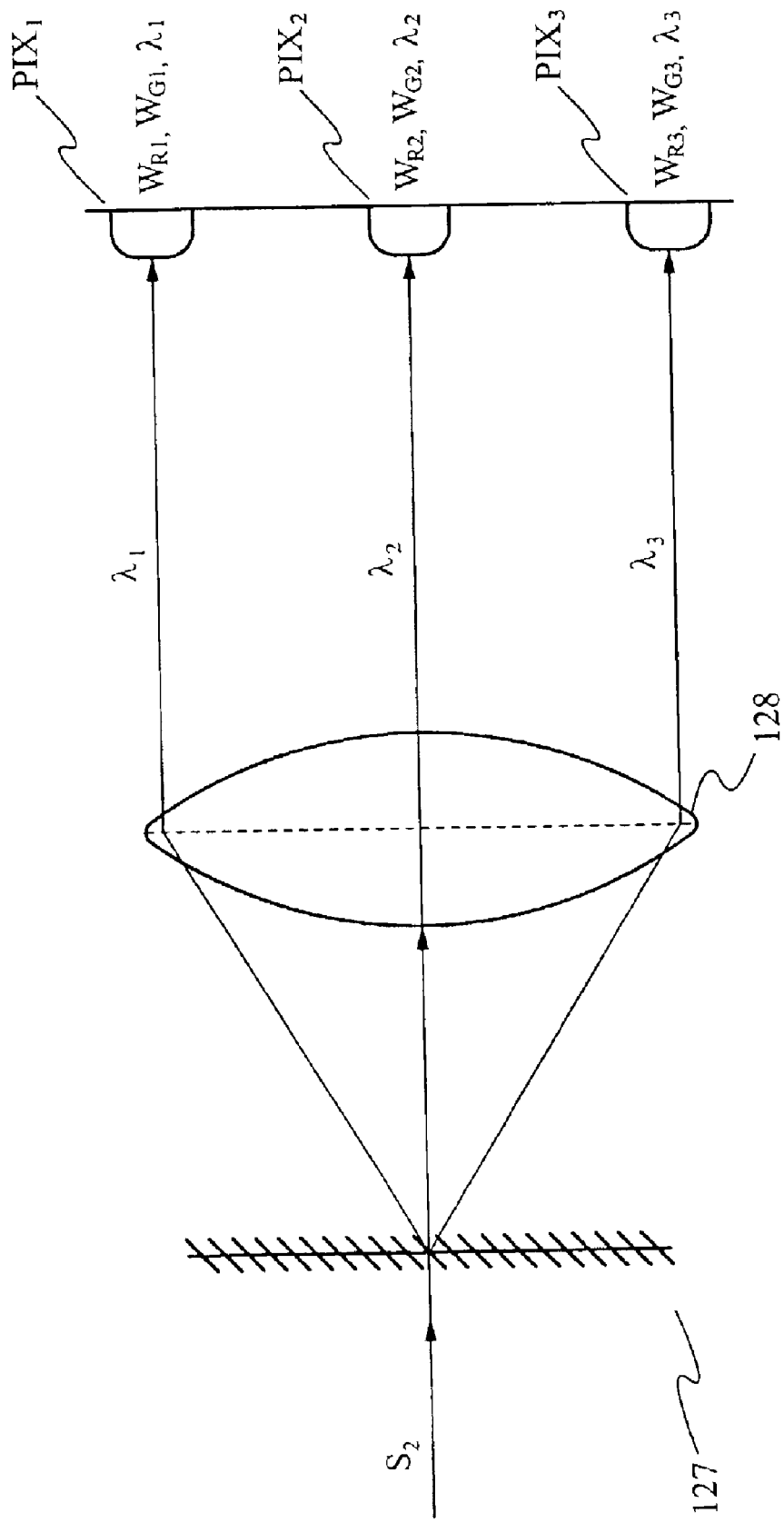
FIG. 11 illustrates a WDM signal demultiplexed through a static grating, with component wavelengths directed to chirped pixels configured to compensate for wavelength-based chirping.

A grating light valve™ light modulator chirped according to this configuration is illustrated in FIG. 11. A signal $S_2$ passes through a static grating demultiplexer 127, and the component signals $\lambda_1$, $\lambda_2$, $\lambda_3$ pass through a transform lens 128. Using the PDL of pixel $PIX_1$ as reference against which the PDL of all other pixels are to be normalized, the PDL of pixel $PIX_2$ is normalized by multiplying both the ribbon widths $W_{R2}$ of pixel $PIX_2$ and the ribbon gap width (or widths) $W_{G2}$ of pixel $PIX_2$ by a ratio of wavelengths according to equations 10 and 11 above, such that, as applied to pixel $PIX_2$ of FIG. 11, $W_{R2} = W_{R1} \cdot (\lambda_2/\lambda_1)$, and $W_{G2} = W_{G1} \cdot (\lambda_2/\lambda_1)$. Similarly, as applied to pixel $PIX_3$ of FIG. 11, $W_{R3} = W_{R1} \cdot (\lambda_3/\lambda_1)$, and $W_{G3} = W_{G1} \cdot (\lambda_3/\lambda_1)$.

Figure 12:
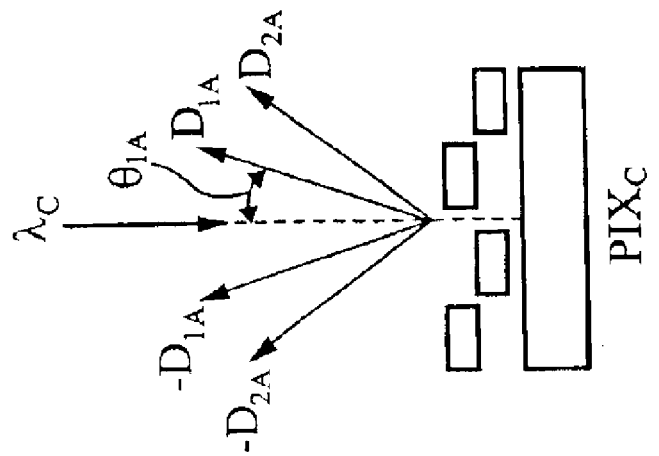
FIG. 12 illustrates a succession of adjacent pixels within a grating light valve™ light modulator configured for limited diffraction chirping.
Figure 12:
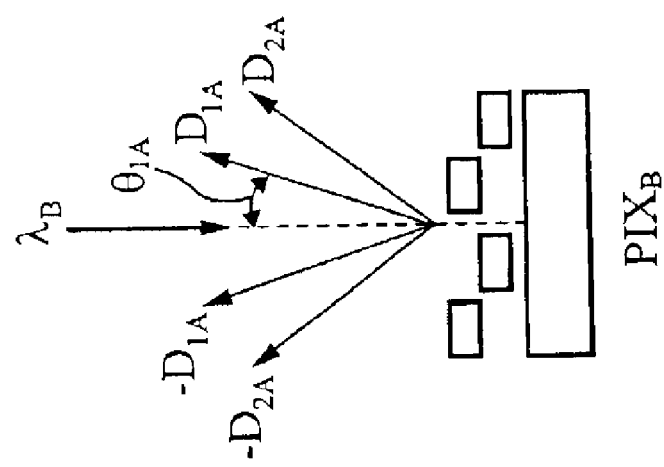
Figure 12:
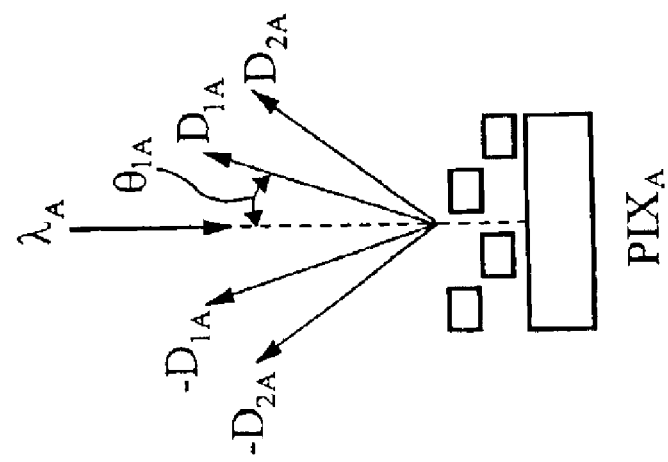

Another phenomena experienced within some optical systems is the wavelength dependent nature of the first order diffraction angle. Because the angle of the diffraction patterns is wavelength dependent, in an unchirped array, as the angle of diffraction changes from pixel to pixel, the bright and dark areas of a diffraction pattern change position. This presents a problem in consistently focusing the bright and dark portions of a diffraction pattern over a range of wavelengths. In contrast, a chirped array of pixels will exhibit a constant angle of first order diffraction patterns if chirped according to a proper mathematical model. FIG. 12 illustrates three pixels properly chirped to produce a constant angle of first order diffraction patterns. The three pixels receive a corresponding incident wavelength, $\lambda_A$, $\lambda_B$, and $\lambda_C$, respectively, which are arranged according to progressively increasing wavelengths from A to C. $D_{1A}$ and $D_{-1A}$ represent the first order diffraction patterns created by pixel $PIX_A$. According to FIG. 18, $\theta_{1A}$ represents the angle between the incident beam $\lambda_A$ and the first order diffraction pattern $D_{1A}$ resulting from incident wavelength $\lambda_A$ falling on pixel $PIX_A$. The three pixels are chirped to produce constant diffraction angles by linearly increasing the ribbon width with increasing incident wavelengths $\lambda_A$, $\lambda_B$, and $\lambda_C$. In FIG. 12, the pixels are chirped based on $PIX_A$ resulting in constant diffraction angles for $PIX_A$, $PIX_B$, and $PIX_C$ according to the diffraction angles of $PIX_A$. In this case, the intra-pixel gap width, also called the ribbon gap width, remains constant. The resulting pixel-center shift due to the increasing ribbon widths does not necessarily coincide with the incident wavelength center-line. Alternatively, the pixel-center shift can coincide with the incident wavelength center-line to provide channel chirping. The relationship between the ribbon width and the incident wavelength, as well as alternative methods for producing constant diffraction angles, are described in detail below.

The pixel chirping embodiment discussed in conjunction with normalizing the PDL of various pixels against a reference pixel, as illustrated in conjunction with FIG. 11 and equations 10 and 11, has the additional benefit of normalizing the first order diffraction angles exhibited by the various pixels against the diffraction angle of the reference pixel $PIX_1$. It is recalled, however, that the chirping of a grating light valve™ light modulator according to the formula of equations 10 and 11 together requires the simultaneous chirping of successive ribbon widths $W_R$ and successive gap widths $W_G$ (FIGS. 6 & 7).

A grating light valve™ light modulator type array chirped according to equations 10 and 11 exhibits a substantially constant diffraction angle across a span of wavelengths, whereas an unchirped grating light valve™ light modulator type array exhibits a proportional increase in the diffraction angle of the first order diffraction pattern as wavelength increases.

An alternative embodiment of a chirped grating light valve™ light modulator type array is envisioned according to the present invention wherein the variations in the diffraction angle of the component wavelengths are normalized against the diffraction angle of a reference wavelength by exclusively altering the ribbon width $W_R$, or exclusively altering the ribbon gap width $W_G$. Alternative equations describing the chirped ribbon widths or chirped ribbon gap widths according to this embodiment are respectively described in Equations 12 and 13 below.

$$W_{R2} = \lambda_2/\lambda_1 \cdot (W_{R1} + W_{G1}) - W_{G1} \qquad 12.$$

$$W_{G2} = \lambda_2/\lambda_1 \cdot (W_{R1} + W_{G1}) - W_{R1} \qquad 13.$$

According to equations 12 and 13 above, $W_{R1}$ represents the width of the ribbons in pixel $PIX_1$, $W_{R2}$ represents the width of the ribbons in pixel $PIX_2$, and the value of $\lambda_2/\lambda_1$ represents the ratio of the respective wavelengths falling on pixels $PIX_2$ and $PIX_1$. $W_{G1}$ represents the width of the ribbon gaps between the ribbons in pixel $PIX_1$, and $W_{G2}$ represents the width of the ribbon gaps between the ribbons in pixel $PIX_2$. Applying equations 12 and 13 above to the illustration of FIG. 11, wherein pixel $PIX_1$ is the reference pixel, the present invention envisions normalizing the diffraction angle of a pixel $PIX_2$ to that of pixel $PIX_1$ by either chirping the width of the ribbons $W_{R2}$ in pixel $PIX_2$ according to equation 12, or by chirping the width of the ribbon gaps $W_{G2}$ in pixel $PIX_2$ according to equation 13.

The application of equations 10 and 11 together is herein called "dual PDL/θ chirping" in that pixel chirping according to these equations simultaneously affects a normalization of both PDL and normalization of the diffraction angle θ. Pixel chirping alternatively performed according to Equations 12 or 13 is herein called "limited diffraction chirping" since either equation is limited exclusively to normalizing diffraction in successive pixels, and is not applicable to normalizing PDL. In either dual PDL/θ chirping or limited diffraction chirping, the pixel gap width (the gap between adjacent pixels) can either remain constant or can vary as a function of the incident wavelength λ.

Not all embodiments implemented to correct for dual PDL/θ chirping and limited diffraction chirping are equally suited to also correct the centerline offset error, using pixel chirping, to account for channel chirping. However, dual PDL/θ chirping is not necessarily incompatible with pixel chirping. By distinguishing between ribbon gaps occurring between ribbons in the same pixel, and pixel gaps occurring between adjacent pixels, it is possible to create a chirped grating light valve™ light modulator type array that corrects for channel chirping and wavelength-based chirping (dual PDL/θ chirping or limited diffraction chirping). The spacing which determines the centerline error offset addressed by channel chirping is not limited to a function of ribbon widths and intra-pixel gap widths. It is exclusively a function of pixel separation $PS_1$, $PS_2$, etc. as illustrated in FIG. 6, which is effected by the combination of ribbon widths, intra-pixel gap widths, and inter-pixel gap widths. Specifically, the center-to-center distance between a first pixel and an adjacent pixel can be determined by one of the methods described above. For example, the center-to-center distance between the first pixel and the adjacent second pixel (FIG. 6) is simply ½ of the additive values of the ribbon gaps $W_{RG}$ and ribbon widths $W_R$ of the first pixel plus ½ the additive values of the ribbon gaps $W_{RG}$ and ribbon widths $W_R$ of the adjacent pixel plus the width of the pixel gap $W_{PG}$ separating the two pixels. According to one embodiment therefore, equations 10 and 11 are first applied to perform dual PDL/θ chirping from a reference pixel. The PDL/θ chirping is directed exclusively to "ribbon gaps" (intra-pixel gaps within a single pixel). This establishes the ribbon widths and ribbon gap widths of the various pixels to level the PDL and diffraction angle offset. After these values are calculated, and taking this spacing into account, values are calculated for the inter-pixel gaps $W_{PG1}$–$W_{PGN}$ (FIG. 6) between the respective pixels to adjust the pixel spacing to match the channel chirping induced by static grating, thereby reducing the centerline offset error induced by the static grating demultiplexer. According to another embodiment, the inter-pixel gap remains constant, and the ribbon widths and ribbon gap widths are established to perform dual PDL/θ chirping while simultaneously accounting for pixel spacing to properly align center-lines for channel chirping.

Figure 13:
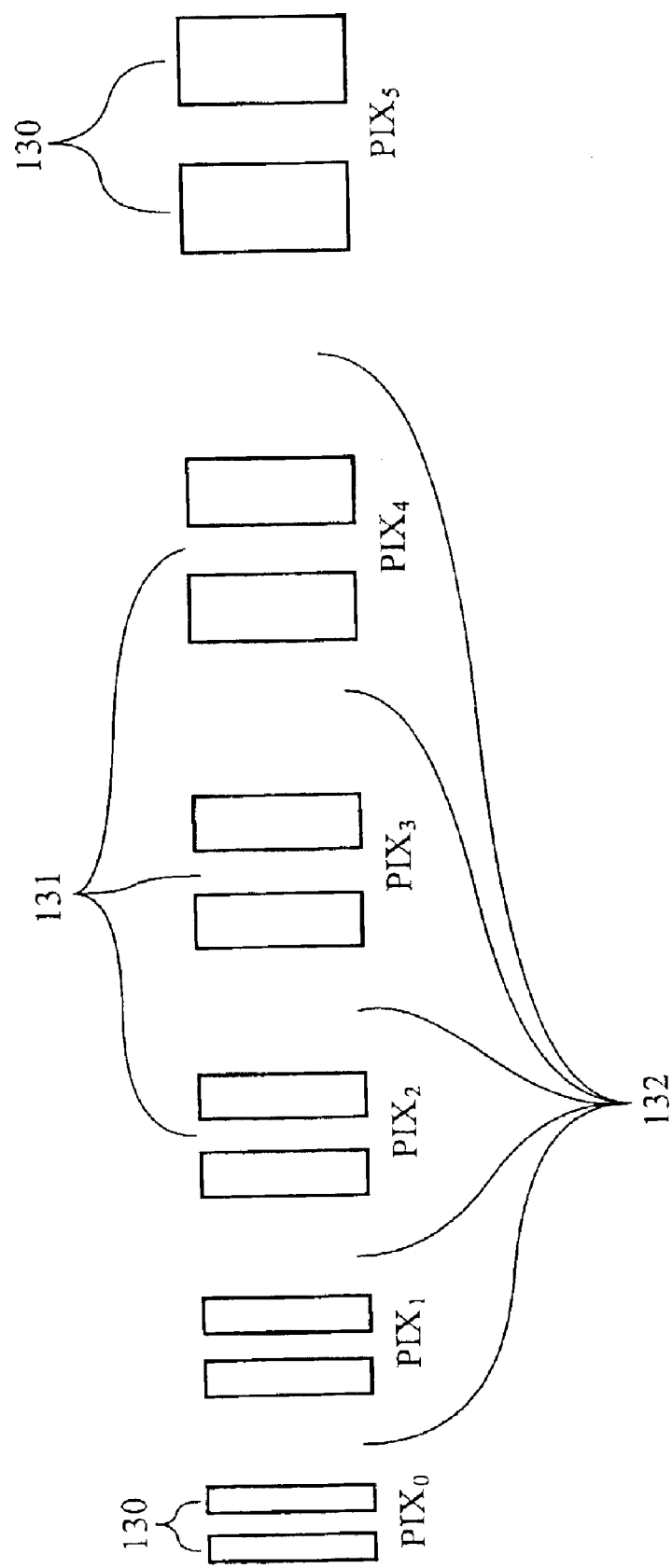
FIG. 13 illustrates multiple pixels in a grating light valve™ light modulator exhibiting chirped intra-pixel gaps, chirped ribbon widths, and chirped inter-pixel gaps, wherein the chirping is performed at independently controllable rates.

FIG. 13 illustrates multiple pixels $PIX_0$–$PIX_5$ in a grating light valve™ light modulator exhibiting chirped intra-pixel gaps 131, chirped ribbon widths 130, and chirped inter-pixel gaps 132, wherein the chirping is performed at independently controllable rates. Calculations are first performed for chirping the ribbon gaps 131 and ribbon widths 130 at a rate necessary to effect PDL normalization and diffraction angle normalization. Subsequently, calculations are performed for adjusting the pixel gap widths in light of the previous calculations. The chirping of the pixel gap widths 132 is at a rate independent of the chirping of the ribbon widths 131, and the pixel gap widths 132 are chirped according to the necessary amount to achieve pixel alignment after accounting for chirping imposed by equations 10 and 11. In this manner, normalization of polarization dependent loss and the diffraction angle is achieved simultaneously to the channel chirping performed to align the various pixels with their respective wavelength.

In the field of telecommunications and many other present day applications, optimum functioning of a grating light valve™ light modulator requires an alignment between component wavelengths of a demultiplexed WDM signal and their respective pixels. Optimum performance further requires the normalizing of polarization dependent loss for the various pixels respectively assigned to various wavelengths. Optimal performance further requires the normalizing of the angle of diffraction induced by the various pixels on their respective wavelengths. The embodiments of the invention as described above, and set forth in the claims herein, are directed to a method of and apparatus for chirping pixels to align component pixels with their respective wavelengths. Embodiments of the present invention are also directed to a method of chirping pixels to normalize the PDL of the various pixels against a reference pixel. Embodiments of the present invention are also directed to a method and apparatus for normalizing the diffraction angle imposed by an array of pixels. Embodiments of the present invention are further directed to independently chirping pixel ribbons, pixel gaps and ribbon gaps to allow the simultaneous implementation of solutions for PDL, diffraction angle, and centerline offset errors experienced in grating light valve™ light modulator type arrays. Embodiments of the present invention are still further directed to singularly, or in any combination, implementing the solutions for dual PDL/θ chirping, limited diffraction chirping and pixel chirping depending on the required application.

Although the aforementioned embodiments of the present invention include a grating light valve™ light modulator, other types of light modulators can be used in alternative embodiments. Such light modulators can include, but are not limited to, tilting mirror arrays and LCD arrays.

The present invention has been described in terms of specific embodiments incorporating details to facilitate the understanding of the principles of construction and operation of the invention. In many cases, the claimed invention can operate without these additional structures or details, or can be made to function with alternative equivalent structures. It will be apparent to those skilled in the art that many of the details found herein are not essential to the manufacture and use of the claimed invention. Accordingly, such reference herein to specific embodiments and details thereof is not intended to limit the scope of the claims appended hereto.

What is claimed is:

1. A light modulator comprising a plurality of ribbons separated by a plurality of gaps, wherein the plurality of ribbons and gaps are grouped into a plurality of pixels in a linear order in the light modulator including a first end pixel and a second end pixel, wherein the plurality of pixels are disposed in succession between the first end pixel and the second end pixel, further wherein a pixel-center separation distance between adjacent pixels is progressively increased as the linear order is transversed from the first end pixel to the second end pixel, the pixel-center separation distance comprising a distance from a center line of a first pixel to a center line of a second pixel adjacent to the first pixel.

2. The light modulator according to claim 1 wherein the pixel-center separation distances are spaced such that a center line of a pixel approximately coincides with a center line of an intensity distribution of a respective incident wavelength impinging upon the pixel.

3. The light modulator according to claim 2 wherein a spacing between center lines of respective incident wavelengths impinging upon adjacent pixels is created by a wavelength division multiplexed signal passing through a static grating.

4. The light modulator according to claim 2 wherein each pixel is separated from an adjacent pixel by a pixel gap such that a pixel gap width of each pixel gap progressively increases from the first end pixel to the second end pixel to cause each pixel center line to approximately coincide with the center line of the intensity distribution of the respective incident wavelength.

5. The light modulator according to claim 4 wherein each pixel includes a pixel width symmetrically aligned about the center line of the pixel such that the pixel width increases from the first end pixel to the second end pixel.

6. The light modulator according to claim 5 wherein the pixel width of the second pixel is equal to a pixel-center separation distance between the second pixel and the first pixel.

7. The light modulator according to claim 5 wherein the pixel width of the second pixel is equal to one-half a pixel-center separation distance between a third pixel and the first pixel, wherein the third pixel is adjacent to the second pixel in the linear order.

8. The light modulator according to claim 5 wherein a ribbon width for all ribbons within the same pixel is constant, a ribbon gap width for all ribbon gaps within the same pixel is constant, and the ribbon width linearly increases from the first end pixel to the second end pixel while the ribbon gap width remains constant.

9. The light modulator according to claim 5 wherein a ribbon width for all ribbons within the same pixel is constant, a ribbon gap width for all ribbons within the same pixel is constant, and the ribbon gap width linearly increases from the first end pixel to the second end pixel while the ribbon width remains constant.

10. The light modulator according to claim 5 wherein a ribbon width for all ribbons within the same pixel is constant, a ribbon gap width for all ribbon gaps within the same pixel is constant, and the ribbon gap width and the ribbon width linearly increase from the last end pixel to the second end pixel.

11. The light modulator according to claim 5 wherein the pixel width is increased by varying the number of ribbons within each pixel.

12. The light modulator according to claim 4 wherein each pixel further comprises a pixel width symmetrically aligned about the center line of the pixel such that the pixel width for the plurality of pixels is constant.

13. The light modulator according to claim 2 wherein each pair of pixels are separated by a pixel gap such that a pixel gap width of each pixel gap is constant, further wherein each pixel comprises a pixel width symmetrically aligned about the center line of the pixel such that the pixel width progressively increases from the first end pixel to the second end pixel to approximately coincide each pixel center line with the center line of the intensity distribution of the respective incident wavelength.

14. The light modulator according to claim 1 wherein each pixel includes a pixel width symmetrically aligned about the center line of the pixel such that the pixel width increases from the first end pixel to the second end pixel.

15. The light modulator according to claim 14 wherein a ribbon width for all ribbons within the same pixel is constant, a ribbon gap width for all ribbon gaps within the same pixel is constant, and the ribbon gap width and the ribbon width linearly increase from the first end pixel to the second end pixel.

16. The light modulator according to claim 14 wherein a ribbon width for all ribbons within the same pixel is constant, a ribbon gap width for all ribbon gaps within the same pixel is constant, and the ribbon width linearly increases from the first end pixel to the second end pixel while the ribbon gap width remains constant.

17. The light modulator according to claim 14 wherein a ribbon width for all ribbons within the same pixel is constant, a ribbon gap width for all ribbons within the same pixel is constant, and the ribbon gap width linearly increases from the first end pixel to the second end pixel while the ribbon width remains constant.

18. A method of aligning a plurality of incident wavelengths with a plurality of pixels in a linear order in a light modulator, the method comprising the step of aligning a center line of each of the plurality of pixels in the linear order to conform to a center line of an intensity distribution of a corresponding one of the plurality of incident wavelengths, wherein a pixel-center separation distance between adjacent pixels is increased with increasing incident wavelength, the pixel-center separation distance comprising a distance from a center line of a first pixel to a center line of a second pixel adjacent to the first pixel.

19. The method according to claim 18 wherein each of the plurality of pixels is separated from an adjacent pixel by a pixel gap comprising a pixel gap width, and the step of aligning comprises configuring a plurality of pixel gap widths such that the plurality of pixels are aligned with their corresponding plurality of incident wavelengths.

20. The method according to claim 18 wherein each of the plurality of pixels includes a plurality of ribbons each comprising a ribbon width, and the step of aligning comprises configuring a plurality of ribbon widths such that the plurality of pixels are aligned with their corresponding plurality of incident wavelengths.

21. The method according to claim 18 wherein each of the plurality of pixels includes a plurality of ribbons, each ribbon within a pixel separated by a ribbon gap comprising a ribbon gap width, and the step of aligning comprises configuring a plurality of ribbon gap widths such that the plurality of pixels are aligned with their corresponding plurality of incident wavelengths.

22. A method of aligning a plurality of incident wavelengths with a plurality of pixels in a light modulator, the method comprising the step of aligning a center line of each of the plurality of pixels to conform to a center line intensity of a corresponding one of the plurality of incident wavelengths, wherein a pixel-center separation distance between adjacent pixels is increased with increasing incident wavelength, the pixel-center separation distance comprising a distance from a center line of a first pixel to a center line of a second pixel adjacent to the first pixel, further comprising the step of normalizing polarization dependent loss among the plurality of pixels according to a reference pixel within the plurality of pixels, wherein the step of normalizing polarization dependent loss comprises the step of adjusting select parameters in a first pixel according to the wavelength assigned to the first pixel such that the polarization dependent loss exhibited by the first pixel is substantially equal to the polarization dependent loss exhibited by the reference pixel.

23. The method according to claim 22 wherein each of the plurality of pixels is configured to produce a first order diffraction pattern oriented according to a first order diffraction angle when a pixel is in a diffraction mode, wherein the method further comprising the step of normalizing a plurality of first order diffraction angles produced among the plurality of pixels against a first order diffraction angle produced by the reference pixel.

24. A method of normalizing polarization dependent loss among a plurality of pixels in a light modulator against a reference pixel, wherein the plurality of pixels are configured to process a plurality of wavelengths, the method comprising the step of adjusting select parameters in a first pixel according to the wavelength assigned to the first pixel such that the polarization dependent loss exhibited by the first pixel is substantially equal to the polarization dependent loss exhibited by the reference pixel.

25. The method according to claim 24 wherein the select parameters include a ribbon width and a ribbon gap width of a gap between ribbons comprising a same pixel.

26. The method according to claim 24 wherein each of the plurality of pixels is configured to produce a first order diffraction pattern oriented according to a first order diffraction angle when a pixel is in a diffraction mode, the method further comprising the step of normalizing a plurality of first order diffraction angles produced among the plurality of pixels against a first order diffraction angle produced by the reference pixel.

27. A method of normalizing the first order diffraction angles among a plurality of pixels in a light modulator against a reference pixel, wherein the plurality of pixels are configured to process a plurality of wavelengths, the method comprising the step of adjusting select parameters in a first pixel according to the wavelength assigned to the first pixel such that the first order diffraction angle exhibited by the first pixel is substantially equal to the first order diffraction angle exhibited by the reference pixel.

28. The method according to claim 27 wherein the select parameters include a ribbon width of each ribbon within a pixel and a ribbon gap width of each gap between ribbons within the pixel.

29. A light modulator comprising:

a. means for directing each of a plurality of wavelengths onto a corresponding pixel among a plurality of pixels in a linear order within a light modulator; and b. means for aligning a center line of each of the plurality of pixels to conform to a center line of an intensity distribution of a corresponding one of the plurality of incident wavelengths, wherein a pixel-center separation distance between adjacent pixels is increased with increasing incident wavelength, the pixel-center separation distance comprising a distance from a center line of a first pixel to a center line of a second pixel adjacent to the first pixel.

* * * * *